United States Patent
Kim et al.

(10) Patent No.: US 12,496,589 B2
(45) Date of Patent: Dec. 16, 2025

(54) FOOD WASTE DISPOSER

(71) Applicant: Samsung Electronics Co., Ltd., Suwon-si (KR)

(72) Inventors: Daegeon Kim, Suwon-si (KR); Namsoo Park, Suwon-si (KR); Kyoungmok Kim, Suwon-si (KR); Wonyoung Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 18/323,322

(22) Filed: May 24, 2023

(65) Prior Publication Data

US 2024/0009680 A1  Jan. 11, 2024

Related U.S. Application Data

(63) Continuation of application No. PCT/KR2023/005622, filed on Apr. 25, 2023.

(30) Foreign Application Priority Data

Jul. 6, 2022  (KR) .................. 10-2022-0083389
Aug. 22, 2022  (KR) .................. 10-2022-0105093

(51) Int. Cl.
*B02C 18/22* (2006.01)
*B02C 18/00* (2006.01)
(Continued)

(52) U.S. Cl.
CPC ...... *B02C 18/2216* (2013.01); *B02C 18/0084* (2013.01); *B02C 18/0092* (2013.01);
(Continued)

(58) Field of Classification Search
CPC .................. B02C 18/0084; B02C 18/0092
See application file for complete search history.

(56) References Cited

U.S. PATENT DOCUMENTS 4,973,002 A * 11/1990 Waller ................ B02C 18/0092
241/46.17
7,954,739 B2  6/2011 Shin-Ya
(Continued)

FOREIGN PATENT DOCUMENTS

JP  2007-275862 A  10/2007
JP  2009-082896 A  4/2009
(Continued)

OTHER PUBLICATIONS

International Search Report and Written Opinion of the International Searching Authority dated Aug. 8, 2023, in connection with International Application No. PCT/KR2023/005622, 10 pages.
(Continued)

*Primary Examiner* — Matthew Katcoff

(57) ABSTRACT

A food waste disposer includes: a housing; a grinding case positioned inside the housing, configured to grind food waste, and separable from the housing, wherein a discharge hole is formed in a bottom of the grinding case; a valve assembly coupled to the grinding case below the discharge hole and configured to open or close the discharge hole, the valve assembly protruding below the grinding case; a storage case positioned below the grinding case and configured to store the grinded food waste from the grinding case; a transfer tube positioned between the valve assembly and the storage case and configured to transfer the grinded food waste from the grinding case to the storage case; and a connector coupled to the transfer tube, wherein a shape of the connector is deformable upon the valve assembly resting on the connector.

20 Claims, 16 Drawing Sheets

(51) Int. Cl.
*B09B 3/35* (2022.01)
*B02C 18/06* (2006.01)
*B09B 101/70* (2022.01)

(52) U.S. Cl.
CPC .............. *B09B 3/35* (2022.01); *B02C 18/067* (2013.01); *B02C 2201/06* (2013.01); *B02C 2201/063* (2013.01); *B02C 2201/066* (2013.01); *B09B 2101/70* (2022.01); *Y02W 30/40* (2015.05); *Y02W 30/52* (2015.05)

(56) References Cited

U.S. PATENT DOCUMENTS

| | | | | |
|---|---|---|---|---|
| 8,267,339 | B2 * | 9/2012 | Park | F26B 1/005 |
| | | | | 241/73 |
| 10,159,986 | B2 | 12/2018 | Lee et al. | |
| 10,189,729 | B2 * | 1/2019 | Maghas | A61L 2/238 |
| 10,906,046 | B2 * | 2/2021 | Crepeau | C05F 17/90 |
| 12,330,165 | B2 * | 6/2025 | Kim | F26B 9/08 |
| 2021/0039109 | A1 * | 2/2021 | Hoen | B02C 18/0092 |

FOREIGN PATENT DOCUMENTS

| | | |
|---|---|---|
| KR | 10-0850222 B1 | 8/2008 |
| KR | 10-2011-0065066 A | 6/2011 |
| KR | 10-2013-0142498 A | 12/2013 |
| KR | 10-1578857 B1 | 12/2015 |
| KR | 10-1579966 B1 | 12/2015 |
| KR | 10-1758276 B1 | 7/2017 |
| KR | 10-1765139 B1 | 8/2017 |
| KR | 10-2019-0000244 A | 1/2019 |
| KR | 10-2019-0104790 A | 9/2019 |

OTHER PUBLICATIONS

Supplementary European Search Report dated May 15, 2025, in connection with European Application No. 23835661.2, 10 pages.

* cited by examiner

FOOD WASTE DISPOSER

CROSS-REFERENCE TO RELATED APPLICATIONS

This application is a Bypass Continuation of International Application No. PCT/KR2023/005622, filed Apr. 25, 2023, which claims priority to Korean Patent Application No. 10-2022-0083389, filed Jul. 6, 2022, and Korean Patent Application No. 10-2022-0105093, filed Aug. 22, 2022, the disclosures of which are herein incorporated by reference in their entirety.

BACKGROUND

1. Field

The present disclosure relates to a food waste disposer having an improved structure.

2. Description of Related Art

Generally, a food waste disposer is an apparatus for treating food waste by drying, stirring, and grinding the food waste. The food waste disposer may include a processor for drying, stirring, and grinding food waste.

Also, the food waste disposer may include a heating device for applying heat to the processor to dry food waste stored in the processor.

The processor may include a grinding case that is used as a container for heating and grinding food waste.

However, a user may need to transfer food waste treated in the processor to a storage container with his/her hand.

Also, because a storage is provided inside a housing, airtightness of a transfer tube connecting the processor to the storage may be not secured in the case in which food waste is automatically transferred to the storage.

SUMMARY

An aspect of the disclosure relates to a food waste disposer having an improved structure to secure airtightness between a processor and a storage device.

A food waste disposer according to a concept of the disclosure may include a housing. The food waste disposer may include a grinding case positioned inside the housing, configured to grind food waste, and separable from the housing, wherein a discharge hole is formed in a bottom of the grinding case. The food waste disposer may include a valve assembly coupled to the grinding case below the discharge hole and configured to open or close the discharge hole, the valve assembly protruding below the grinding case. The food waste disposer may include a storage case positioned below the grinding case and configured to store the grinded food waste from the grinding case. The food waste disposer may include a transfer tube positioned between the valve assembly and the storage case and configured to transfer the grinded food waste from the grinding case to the storage case. The food waste disposer may include a connector coupled to the transfer tube, wherein a shape of the connector may be deformable upon the valve assembly resting on the connector.

The connector may include a sealing flange extending from an inner surface of the connector toward the transfer tube.

The transfer tube may include: a transfer body forming a space through which the grinded food waste is transferred; and a transfer end portion formed at an upper portion of the transfer body and in contact with the sealing flange of the connector.

The connector may include a transfer tube inserting groove formed between the inner surface of the connector and the sealing flange.

Upon installation of the grinding case in the housing, the shape of the connector may be deformed so that the transfer end portion of the transfer tube is inserted into the transfer tube inserting groove.

The connector may include: an upper body extending at an incline so that the valve assembly may rest on the upper body; a lower body extending downward from the upper body and surrounding a portion of the transfer tube; and a sealing flange extending toward an inner surface of the transfer tube from a portion at which the upper body is connected to the lower body.

The sealing flange may move to an inside of the transfer tube according to the valve assembly compressing the upper body.

The lower body may include a transfer tube cover portion configured to bend outward in a radial direction of the transfer tube according to the valve assembly compressing the upper body.

The lower body may further include a fixing portion connected to the transfer tube cover portion and fixed in position with respect to the transfer tube by inserting a portion of the transfer tube in the fixing portion.

The upper body may include: a valve resting portion in contact with the valve assembly; and a valve cover portion extending outward from the valve resting portion.

The valve resting portion may include: a first inclined surface extending with a first angle with respect to an installation surface; and a second inclined surface extending with a second angle with respect to the installation surface, wherein the second angle is different from the first angle.

The food waste disposer may further include a storage including a storage cover configured to selectively cover an open upper side of the storage case.

The transfer tube may include: a transfer body forming a space through which food waste is transferred; a connector installing portion extending outward in a radial direction from the transfer body so that the connector is inserted in the connector installing portion; and a cover sealing portion accommodated inside the storage cover and extending outward in the radial direction from the transfer body at a lower location than the connector installing portion to seal a gap with the storage cover.

The connector may include a silicon material.

A height of the connector may change along an up-down direction.

A food waste disposer according to a concept of the disclosure may include: a housing; a processor configured to treat food waste and separable from inside of the housing; a storage positioned below the processor inside the housing and configured to store the treated food waste from the processor; a transfer tube of which one side is coupled to the storage, wherein the transfer tube may be fixed between the processor and the storage; and a connector coupled to an upper portion of the transfer tube and configured to guide the treated food waste in the processor to the transfer tube, wherein upon installation of the processor in the housing, the connector is pressed downward by the processor and a shape of the connector is deformed such that a portion of the connector is inserted in a transfer end portion of the transfer tube.

The connector may include a sealing flange extending from an inner surface of the connector toward the transfer tube and accommodatable inside the transfer tube.

The connector may include an upper body formed at an incline such that a portion of the processor rests on the upper body, and a lower body extending downward from the upper body to cover an outer surface of the transfer tube, the lower body bendable outward in a radial direction of the transfer tube.

A food waste processor according to a concept of the disclosure may include: a housing; a processor configured to treat food waste and separable from an inside of the housing to outside; a storage positioned below the processor inside of the housing and configured to store the grinded food waste from the processor; a transfer tube of which a lower portion is coupled to the storage, the transfer tube positioned between the processor and the storage; and a connector coupled to an upper portion of the transfer tube and connecting the processor to the transfer tube, wherein a shape of the connector is deformable, wherein the connector includes: an upper body on which the processor rests; a lower body extending downward from the upper body to cover an outer surface of the transfer tube and bendable outward in a radial direction of the transfer tube; and a sealing flange extending from an inner surface of the lower body toward inside of the transfer tube.

The connector may further include a transfer tube inserting groove formed between the sealing flange and the lower body.

According to the disclosure, by forming a sealing flange on an inner surface of a transfer tube, airtightness between the transfer tube and a connector may be secured upon installation of a processor in the housing.

According to the disclosure, by providing a connector of which a shape is deformable, a processor may be in complete contact with a heating device while a portion at which the connector is in contact with a valve assembly is sealed, thereby securing heat transfer efficiency.

Before undertaking the detailed description below, it may be advantageous to set forth definitions of certain words and phrases used throughout this patent document: the terms "include" and "comprise," as well as derivatives thereof, mean inclusion without limitation, the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
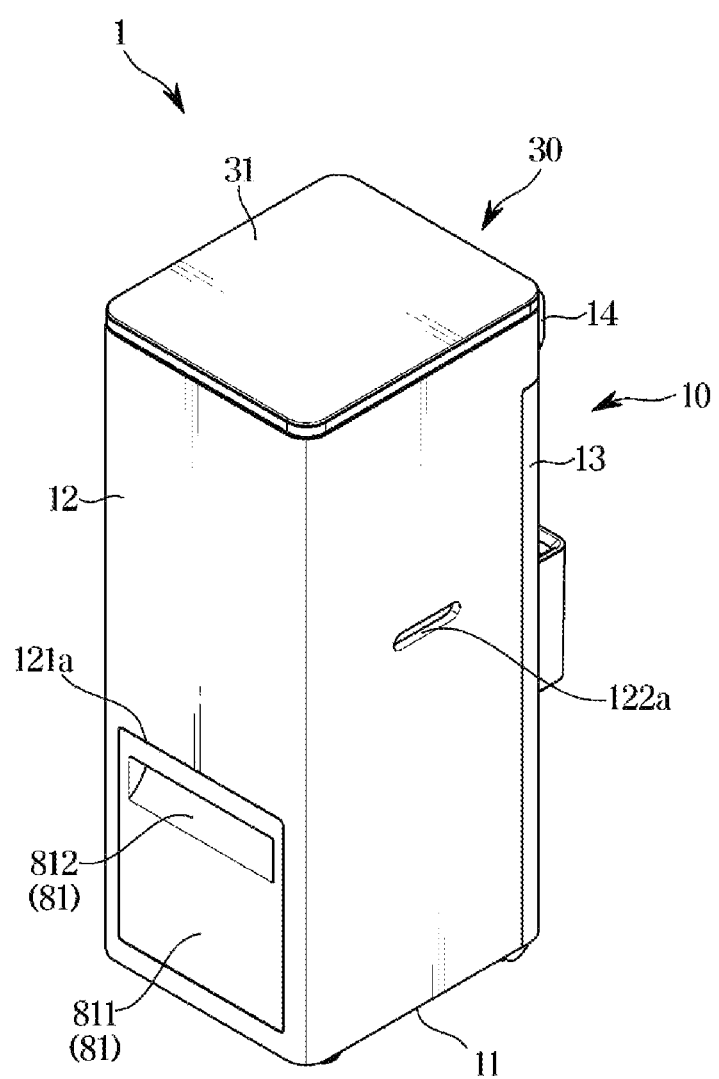
FIG. 1 is a perspective view showing a food waste disposer according to an embodiment of the disclosure in a front direction.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, an embodiment of the disclosure will be described in detail with reference to the accompanying drawings.

Figure 2:
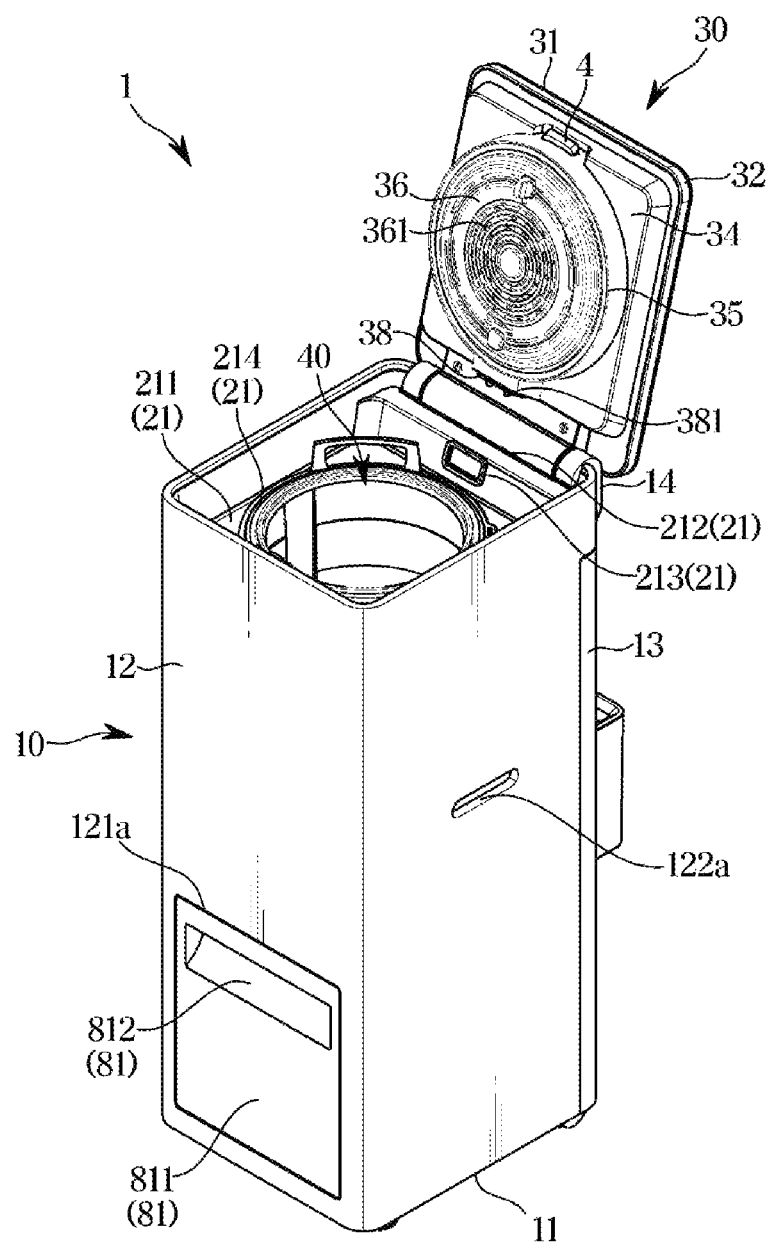
FIG. 2 is a perspective view showing a food waste disposer according to an embodiment of the disclosure in a front direction after a cover device of the food waste disposer opens.
Figure 3:
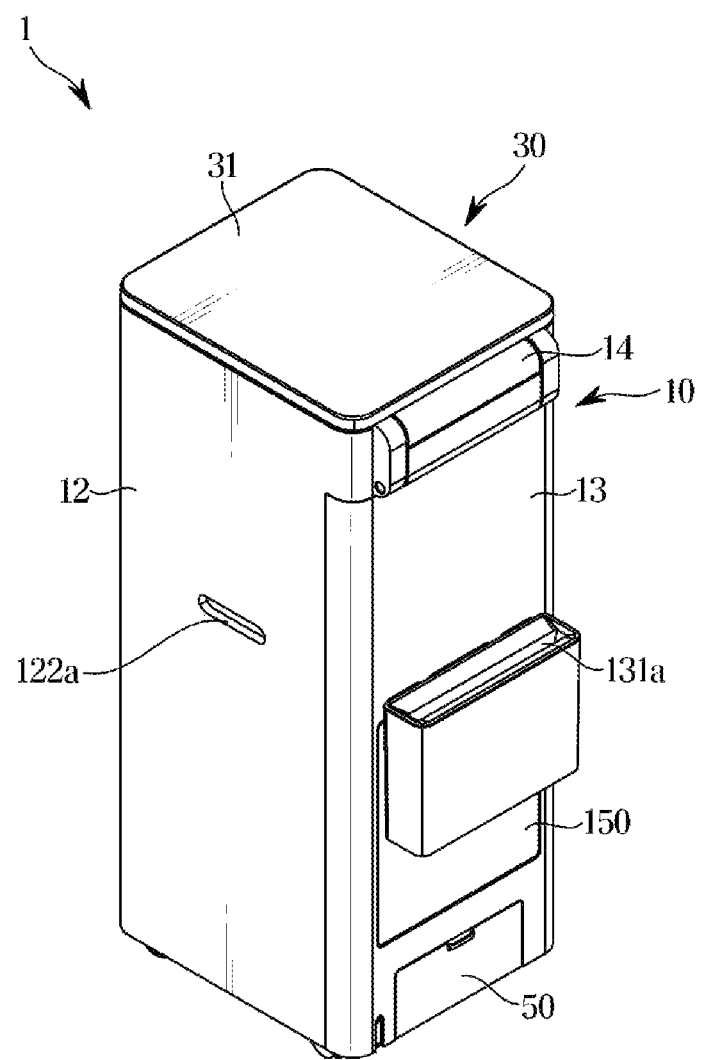
FIG. 3 is a perspective view showing a food waste disposer according to an embodiment of the disclosure in a rear direction.

FIG. 1 is a perspective view showing a food waste disposer according to an embodiment of the disclosure in a front direction. FIG. 2 is a perspective view showing a food waste disposer according to an embodiment of the disclosure in a front direction after a cover device of the food waste disposer opens. FIG. 3 is a perspective view showing a food waste disposer according to an embodiment of the disclosure in a rear direction.

Referring to FIGS. 1 to 3, a food waste disposer 1 may include a housing 10, and a cover device 30 covering an upper portion of the housing 10.

The housing 10 may form an appearance of the food waste disposer 1. For example, the housing 10 may include a base housing 11, and a first cover housing 12 and a second cover housing 13 positioned above the base housing 11.

The base housing 11 may form a bottom surface of the food waste disposer 1, and the first cover housing 12 and the second cover housing 13 may form side surfaces of the food waste disposer 1.

The base housing 11, the first cover housing 12, and the second cover housing 13 may be detachably coupled to each other.

In FIGS. 1 to 3, the first cover housing 12 and the second cover housing 13 are shown to be separate components, although not limited thereto. However, the first cover housing 12 and the second cover housing 13 may be integrated into one body.

A user or an installation engineer may easily access various components positioned inside the food waste disposer 1 by separating the first cover housing 12 and the second cover housing 13 from the base housing 11.

The first cover housing 12 of the food waste disposer 1 may include a storage accommodating portion 121a and a housing gripping portion 122a.

The storage accommodating portion 121a may be formed by opening a portion of a front side of the first cover housing 12. The storage accommodating portion 121a may accommodate a storage case 81 of a storage 80 which will be described below. The storage case 81 may be withdrawn from the storage accommodating portion 121a in a front direction or inserted into the storage accommodating portion 121a in a rear direction.

For example, the storage case 81 may be withdrawn from the storage accommodating portion 121a or inserted into the storage accommodating portion 121a by sliding along a front-rear direction of the food waste disposer 1.

In a front surface of the storage case 81, a storage gripping portion 812 that may be gripped may be formed.

A storage body 811 of the storage case 81 may form a front surface of the storage case 81. The storage body 811 of the storage case 81 may be exposed to outside of the food waste disposer 1 through the storage accommodating portion 121 of the first cover housing 12.

The storage gripping portion 812 of the storage case 81 may have a shape depressed in the rear direction from a front surface of the storage body 811 of the storage case 81.

The storage body 811 of the storage case 81 may include a window which is not shown in the drawings. A user may check an amount of food waste collected inside the storage case 81 with his/her naked eye through the window including a transparent material.

The housing gripping portion 122a of the first cover housing 12 may be formed by cutting a portion of the first cover housing 12. The user may move the food waste disposer 1 by gripping the food waste disposer 1 through the housing gripping portion 122a.

The food waste disposer 1 may include a housing exhaust portion 131a provided on a rear side of the second cover housing 13.

The housing exhaust portion 131a may communicate with a filter discharge portion 153 (see FIG. 4) of a filter assembly 150. Accordingly, air filtered in the filter assembly 150 may be discharged to the outside of the food waste disposer 1 through the filter discharge portion 153 and the housing exhaust portion 131a.

A water storage container 50 may be positioned below the filter assembly 150. The water storage container 50 may be detachably installed on the base housing 11. The water storage container 50 may collect condensed water generated in a deodorizing device 100. Details about this will be described below.

The food waste disposer 1 may include a hinge housing 14. The hinge housing 14 may connect the cover device 30 to the housing 10. For example, the hinge housing 14 may be connected to the cover device 30 and coupled to the second cover housing 13. Accordingly, the cover device 30 may be rotatable with respect to the housing 10 through the hinge housing 14.

The cover device 30 may open or close an open upper side of the housing 10. The cover device 30 may be rotatably mounted on the housing 10 to cover the upper side of the housing 10.

For example, the cover device 30 may cover open upper sides of the first cover housing 12 and the second cover housing 13.

The cover device 30 may be mounted on the housing 10 to cover an upper side of a processor 40. The cover device 30 may transfer inside air of the processor 40 to the deodorizing device 100 in a state of closing the housing 10. Details about this will be described below.

Figure 4:
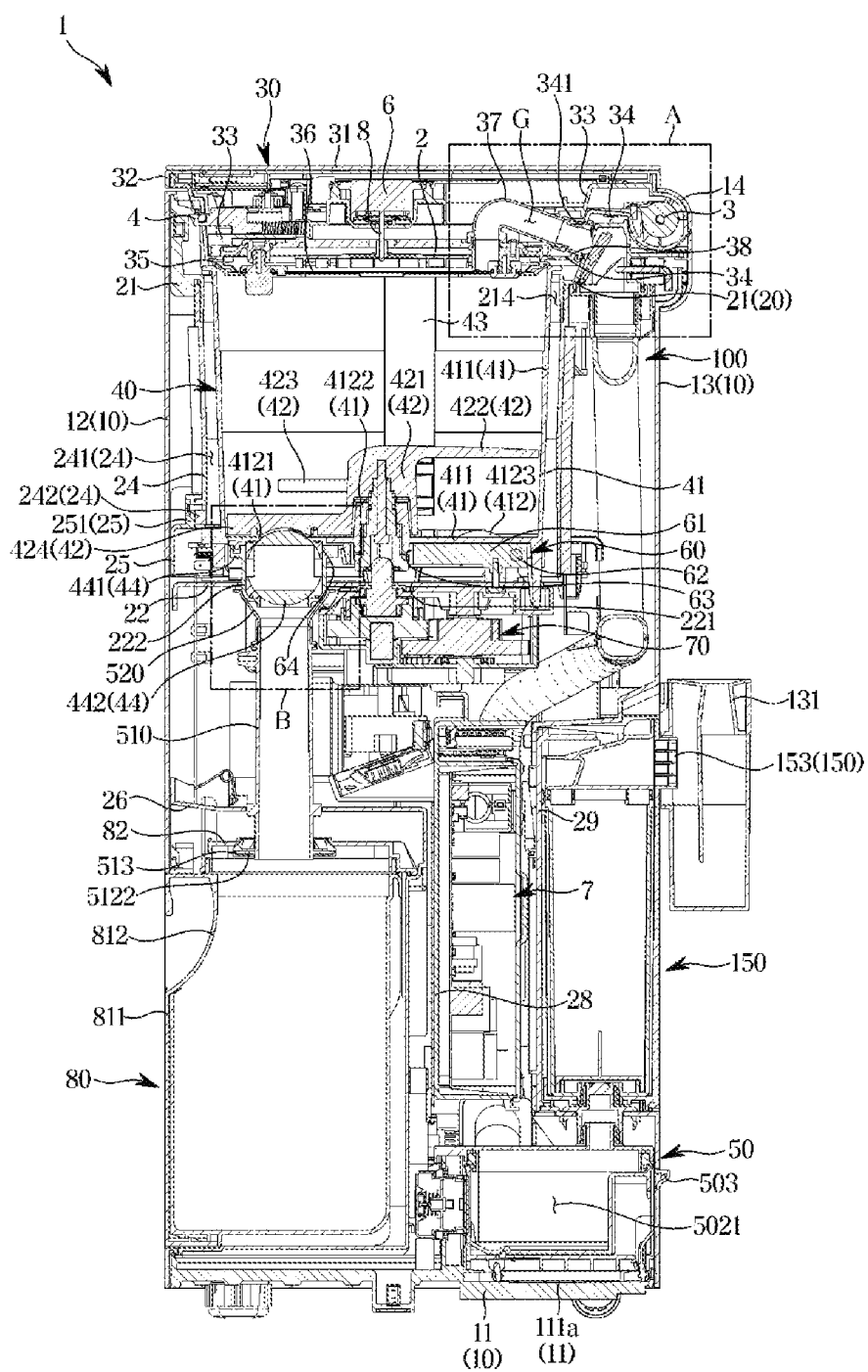
FIG. 4 is a cross-sectional view of a food waste disposer according to an embodiment of the disclosure.
Figure 5:
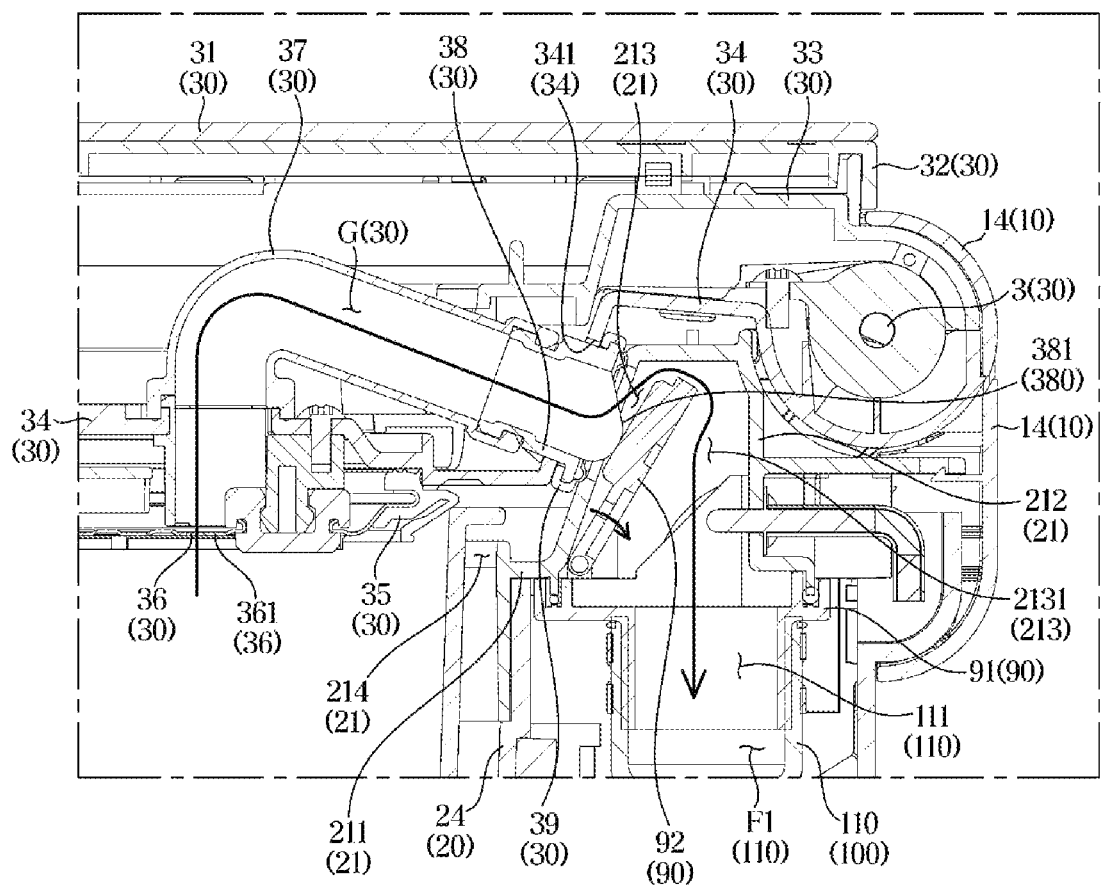
FIG. 5 is an enlarged view showing an A part of FIG. 4.

FIG. 4 is a cross-sectional view of a food waste disposer according to an embodiment of the disclosure. FIG. 5 is an enlarged view showing an A part of FIG. 4.

Hereinafter, an overall configuration of the food waste disposer 1 according to an embodiment of the disclosure will be described with reference to FIGS. 1 to 5.

Referring to FIGS. 4 and 5, the food waste disposer 1 may include the cover device 30 mounted on an outer side of the housing 10 to open or close the upper side of the processor 40, and the processor 40 that is accommodated inside the housing 10.

The cover device 30 may include a top plate 31, an upper frame 32, a middle frame 33, and a lower frame 34.

The top plate 31 may form an upper surface of the food waste disposer 1. For example, in a state in which the cover device 30 closes the upper side of the housing 10, the top plate 31 may be provided as the upper surface of the food waste disposer 1. The top plate 31 may form an upper appearance of the food waste disposer 1.

The upper frame 32, the middle frame 33, and the lower frame 34 may be positioned below the top plate 31. The upper frame 32 may be coupled to the middle frame 33. The middle frame 33 may be coupled to the lower frame 34. The middle frame 33 may be positioned between the upper frame 32 and the lower frame 34.

A certain accommodating space may be formed between the upper frame 32 and the middle frame 33. A certain accommodating space may be formed between the middle frame 33 and the lower frame 34.

For example, the middle frame 33 may be coupled to the upper frame 32 in such a way as to form a space having a certain gap in an up-down direction. Also, the middle frame 33 may be coupled to the lower frame 34 in such a way as to form a space having a certain gap in the up-down direction.

The cover device 30 may include a cover frame 36 and a cover gasket 35.

The cover frame 36 may form a lower surface of the cover device 30. The cover frame 36 may have a size that is accommodated in a food waste inlet corresponding to an upper portion of the processor 40. The cover frame 36 may include an inlet hole 361 (see FIG. 2) to which air flows from the processor 40. Inside air of the processor 40 may flow to a guide duct 37 which will be described below, through the inlet hole 361 of the cover frame 36.

The cover frame 36 may have a shape corresponding to the inlet of the processor 40. Referring to FIG. 2, because the inlet of the processor 40 is in a shape of a circle, the cover frame 36 may also be in a shape of a circle. However, the shape of the cover frame 36 and the inlet of the processor 40 is not limited to this.

The cover gasket 35 may cover an outer edge of the cover frame 36.

The cover gasket 35 may seal between the cover frame 36 and the inlet of the processor 40. The cover gasket 35 may be in contact with an upper edge of the processor 40.

For example, the cover gasket 35 may prevent inside air of the processor 40 from leaking out of the cover device 30 in the state in which the cover device 30 closes the upper portion of the housing 10. Accordingly, the cover gasket 35 may prevent air containing pollutants inside the processor 40 from leaking out of the food waste disposer 1 without passing through the deodorizing device 100.

The cover gasket 35 may be made of a material having certain elasticity.

The cover device 30 may be rotatable with respect to the housing 10 on a cover rotating shaft 3. For example, the cover rotating shaft 3 may be coupled to the hinge housing 14 such that the cover device 30 rotates to open or close the upper portion of the housing 10.

However, an operation of the cover device 30 is not limited to this, and the cover device 30 may slide or be completely separated from the housing 10 to open or close the upper portion of the housing 10, without the hinge housing 14.

The cover device 30 may include a locking member 4.

The locking member 4 may be installed in the middle frame 33. The locking member 4 may be elastically movable along the front-rear direction of the food waste disposer 1.

The locking member 4 may be inserted in an accommodating frame 21 which will be described below. Accordingly, while the cover device 30 closes the upper portion of the housing 10, the locking member 4 may maintain a closed state by the cover device 30.

However, a shape of the locking member 4 is not limited to this, and the locking member 4 may be provided in a shape of a hook to temporarily fix a position of the cover device 30.

The cover device 30 may include a circulating fan 2, a circulating fan rotating shaft 8, and a circulating fan driver 6.

The circulating fan 2 may be positioned between the middle frame 33 and the lower frame 34. The circulating fan driver 6 may be positioned between the upper frame 32 and the middle frame 33.

The circulating fan rotating shaft 8 may connect the circulating fan 2 to the circulating fan driver 6 to transfer power of the circulating fan driver 6 to the circulating fan 2. The circulating fan rotating shaft 8 may be coupled to the circulating fan 2 by penetrating the middle frame 33.

The circulating fan 2 may be provided above the processor 40 to evenly spread internal heat of a grinding case 41 of the processor 40.

For example, according to heating of the processor 40 by a heating device 60 provided below the processor 40, food waste stored in the processor 40 may be heated.

At this time, food waste stored in the processor 40 may be more heated at an area close to the heating device 60. The food waste stored in the processor 40 may be unevenly heated.

Accordingly, by positioning the circulating fan 2 in the cover device 30, internal heat of the processor 40 may be evenly circulated. In other words, the circulating fan 2 may cause a convection phenomenon inside the grinding case 41.

Accordingly, inside temperature of the grinding case 41 may become nearly uniform regardless of area, and drying efficiency of food waste stored in the grinding case 41 may be improved.

The cover device 30 may include the guide duct 37.

The guide duct 37 may penetrate the lower frame 34. According to a rotation of the cover device 30, the guide duct 37 may rotate together with the cover device 30.

For example, while the cover device 30 closes the upper portion of the housing 10, one end of the guide duct 37 may face inside of the grinding case 41 together with the cover frame 36.

For example, while the cover device 30 closes the upper portion of the housing 10, one end of the guide duct 37 may be toward a down direction.

The guide duct 37 may be installed inside the cover device 30. One end of the guide duct 37 may be fixed to the lower frame 34. The one end of the guide duct 37 may open toward the cover frame 36. Another end of the guide duct 37 may be coupled to a connecting duct 38 which will be described below.

The guide duct 37 may extend in a shape of a curved line. The shape of the guide duct 37 is not limited to this. For example, the shape of the guide duct 37 is not limited as long as the guide duct 37 guides inside air of the grinding case 41 to an exhaust pipe.

The guide duct 37 may form a guide flow path G, which air of the processor 40 enters. The guide flow path G may communicate with the processor 40. More specifically, because one end of the guide duct 37 opens toward the cover frame 36, air of the processor 40, entered the inlet hole 361 of the cover frame 36, may enter the guide duct 37.

The cover device 30 may include the connecting duct 38 and a duct sealing member 39.

The connecting duct 38 may be coupled to the other end of the guide duct 37. For example, the connecting duct 38 may be coupled to a rear end of the guide duct 37. The connecting duct 38 may be coupled to a duct installing portion 341 of the lower frame 34.

The connecting duct 38 may connect the guide duct 37 accommodated in the cover device 30 to an exhaust portion 213 formed in the accommodating frame 21. One end of the connecting duct 38 may be connected to the guide duct 37, and another end of the connecting duct 38 may protrude toward outside of the cover device 30 through the duct installing portion 341.

The connecting duct 38 may include a pusher 381. The pusher 381 may protrude outward in the rear direction of the cover device 30.

The pusher 381 may press a blocking member 92 for maintaining a closed state of the exhaust portion 213 of the accommodating frame 21 which will be described below. Details about this will be described below.

The duct sealing member 39 may be coupled to the other end of the connecting duct 38. For example, the duct sealing member 39 may be coupled to a portion of the connecting duct 38, protruding toward the outside of the cover device 30 through the duct installing portion 341.

The duct sealing member 39 may create a seal between the connecting duct 38 of the cover device 30 and the exhaust portion 213 of the accommodating frame 21. While the cover device 30 closes the upper portion of the housing 10, the duct sealing member 39 may prevent air moved to the connecting duct 38 through the guide duct 37 from leaking to a gap between the connecting duct 38 and the exhaust portion 213. Accordingly, air including pollutants may be prevented from leaking to the outside without passing through the deodorizing device 100.

The processor 40 may be positioned below the cover device 30 to be opened or closed by the cover device 30.

The processor 40 may include the grinding case 41 in which food waste is treated. Food waste treatment may be used as a term meaning a process of drying, stirring, and grinding food waste. Alternatively, food waste treatment may be used as a term meaning a process of drying, stirring, or grinding food waste.

The processor 40 may accommodate food waste. The processor 40 may be positioned inside the housing 10 in such a way as to be detachable from the housing 10. The processor 40 may include a handle portion 413. A user may grip the handle portion 413 to separate the processor 40 from the inside of the housing 10 to the outside of the housing 10.

An upper portion of the grinding case 41 may open to form an inlet. The user may put food waste into the processor 40 through the inlet of the grinding case 41.

The inlet of the grinding case 41 may be closed by the cover frame 36 of the cover device 30. The cover gasket 35 of the cover device 30 may seal a gap between the inlet of the grinding case 41 and the cover frame 36.

The grinding case 41 may include a side wall 411 and a bottom 412.

On the side wall 411 of the grinding case 41, a fixed grinder 43 may be mounted. On the bottom 412 of the grinding case 41, a rotating grinder 42 may be rotatably connected to a first driver 500.

The rotating grinder 42 and the fixed grinder 43 may grind food waste through an interaction.

The rotating grinder 42 may include a rotating body 421 to which a grinder shaft of the first driver 500 is coupled. The rotating grinder 42 may include a first grinder 422, a second grinder 423, and a third grinder 424 that extend in a radial direction from the rotating body 421.

The first grinder 422, the second grinder 423, and the third grinder 424 may be arranged at different heights to stir and grind food waste.

In FIG. 4, the rotating grinder 42 is shown to include the first grinder 422 to the third grinder 424. However, a number of grinders is not limited to this.

The grinding case 41 may grind food waste.

In the bottom 412 of the grinding case 41, a discharge hole 4121 may be formed. The discharge hole 4121 may be formed by cutting a portion of the bottom 412 of the grinding case 41. Food waste treated inside the grinding case 41 may be transferred to the storage 80 through the discharge hole 4121.

In the bottom 412 of the grinding case 41, a rotating shaft accommodating portion 4122 may be formed. The rotating shaft accommodating portion 4122 may extend upward from a center of the grinding case 41. The grinder shaft of the first driver 500 may be inserted in the rotating shaft accommodating portion 4122 to transfer power to the rotating body 421 of the rotating grinder 42.

The processor 40 may include a valve assembly 44.

The valve assembly 44 may include a valve case 441 and a valve member 442.

The valve case 441 may be installed in or coupled to a lower portion of the grinding case 41. The valve case 441 may be coupled to the grinding case 41 at a location of communicating with the discharge hole 4121 of the grinding case 41.

The valve case 441 may accommodate the valve member 442 therein. More specifically, the valve case 441 may cover an outer side of the valve member 442 such that the valve member 442 is rotatable inside the valve case 441.

The valve member 442 may be rotatable inside the valve case 441. The valve member 442 may open or close the discharge hole 4121 of the grinding case 41 by rotating.

The valve member 442 may pass through the discharge hole 4121 of the grinding case 41 and protrude upward from the bottom 412 of the grinding case 41. Accordingly, a lower surface of the third grinder 424 of the rotating grinder 42 may be depressed inward to correspond to a protruding shape of the valve member 442. Accordingly, the third grinder 424 may be prevented from interfering with the valve member 442.

Due to the shape of the third grinder 424, a protrusion 4123 may be formed on the bottom 412 of the grinding case 41.

The protrusion 4123 may protrude upward from the bottom 412.

By forming the protrusion 4123 corresponding to the depressed shape of the third grinder 424 on the bottom 412 of the grinding case 41, the third grinder 424 may transfer all food waste collected on the bottom 412 of the grinding case 41 to the discharge hole 4121 and efficiently stir the food waste.

The valve member 442 may be provided in a shape of a ball, wherein a portion of inside of the valve member 442 may open. The valve member 442 may be a ball valve provided in a shape of a ball.

The valve member 442 of the valve assembly 44 may rotate by receiving a driving force from a driver 70. For example, the valve member 442 may rotate by receiving a driving force from a second driver 72 to open or close the discharge hole 4121 of the grinding case 41.

Also, according to a rotation of the valve member 442 to open the discharge hole 4121, the second driver 72 may interfere with an upward movement of the valve member 442 to prevent the valve member 442 from separating from the second driver 72.

Accordingly, in a case in which a user separates the processor 40 without recognizing an open state of the discharge hole 4121, food waste may be prevented from discharging.

The food waste disposer 1 may include the heating device 60.

The heating device 60 may include a heating frame 61 and a heating wire 62 accommodated inside the heating frame 61.

The heating frame 61 may be in contact with a lower portion of the processor 40. The heating wire 62 accommodated inside the heating frame 61 may heat the bottom 412 of the processor 40.

The food waste disposer 1 may include the driver 70.

The driver 70 may be positioned below the heating device 60.

Figure 6:
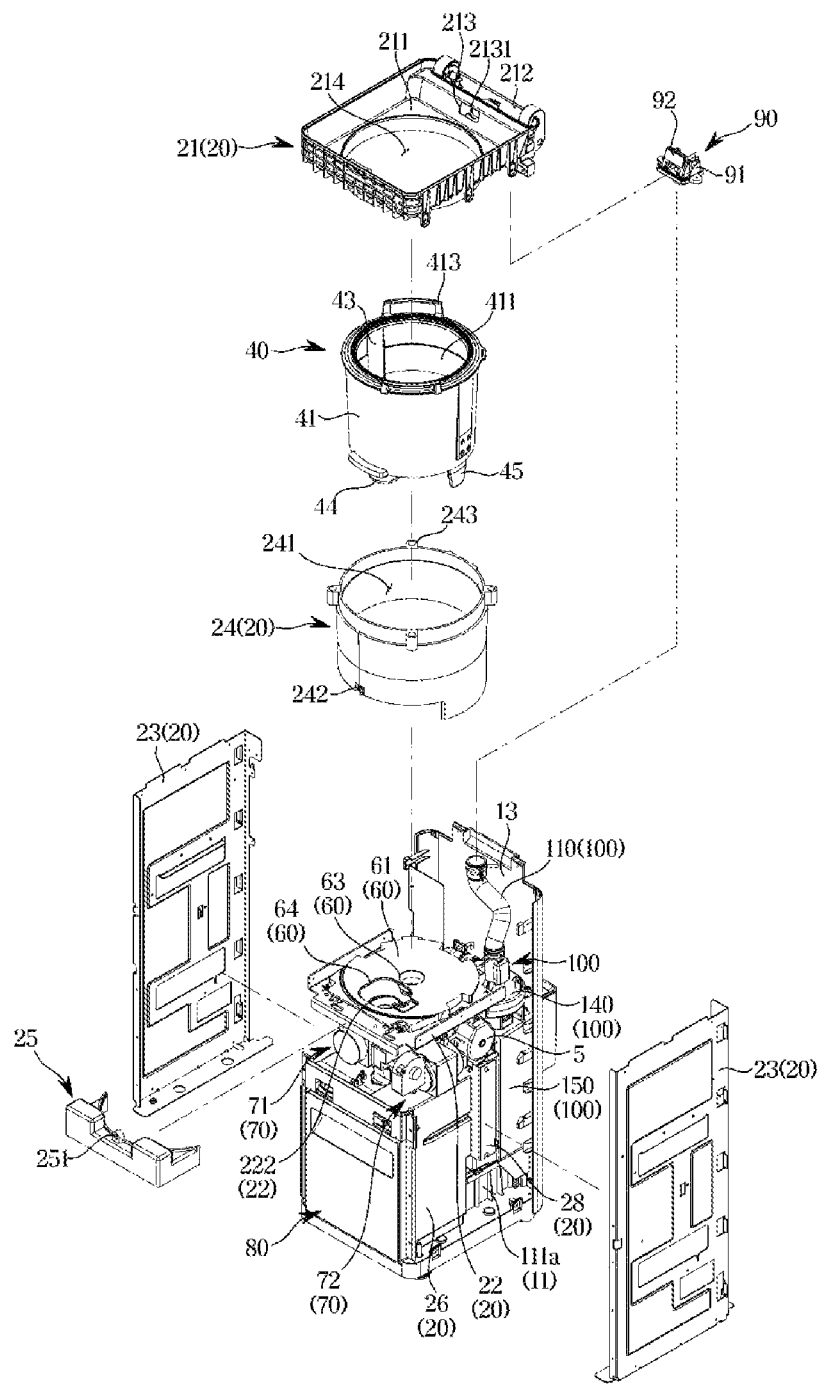
FIG. 6 is an exploded view showing some components of a food waste disposer according to an embodiment of the disclosure in the front direction.

The driver 70 may include the first driver 71 (see FIG. 6) and the second driver 72 (see FIG. 6).

The first driver 71 may transfer a driving force to the rotating grinder 42 of the processor 40, and the second driver 72 may transfer a driving force to the valve assembly 44 of the processor 40.

The food waste disposer 1 may include the storage 80.

The storage 80 may be positioned inside a storage frame. The storage 80 may be connected to a transfer tube 510. An upper end of the transfer tube 510 may be connected to the valve assembly 44, and a lower end of the transfer tube 510 may be connected to the storage 80. More specifically, the upper end of the transfer tube 510 may be connected to a connector 520 to be connected to the valve assembly 44. Details about this will be described below.

Food waste treated in the processor 40 may be transferred to the connector 520 and the transfer tube 27 while the valve assembly 44 opens the discharge hole 4121. The food waste transferred to the transfer tube 510 may be stored in the storage 80.

The storage 80 may be positioned below a front portion of the processor 40 to store food waste treated in the processor 40.

The storage 80 may include the storage case 81, and the storage body 811 coupled to the storage case 81 and exposed to the outside of the food waste disposer 1. In an upper end of the storage body 811, the storage gripping portion 812 may be formed. Accordingly, a user may separate the storage 80 from the housing 10 by gripping the storage gripping portion 812 to empty food waste collected in the storage 80 from the storage 80.

The food waste disposer 1 may include an electronic component portion 7. Electronic components such as various circuit boards may be positioned in the electronic component portion 7.

The food waste disposer 1 may include a controller. The controller may control various components of the food waste disposer 1. Accordingly, the controller may control an operation of the food waste disposer 1 based on an electronic signal generated in the electronic component portion 7.

The food waste disposer 1 may include an exhaust portion opening/closing device 90.

The exhaust portion opening/closing device 90 may include a frame coupling body 91 and a blocking member 92. The blocking member 92 may open or close the exhaust portion 213 of the accommodating frame 21. The blocking member 92 may be at a position of closing the exhaust portion 213 while the cover device 30 opens the upper portion of the housing 10.

The frame coupling body 91 may be connected to an end of a first exhaust pipe 110 which will be described below. The frame coupling body 91 may be coupled to a lower portion of the accommodating frame 21.

The frame coupling body 91 may connect the accommodating frame 21 to the first exhaust pipe 110. The frame coupling body 91 may form a communicating space 2131 therein. The communicating space 2131 may communicate with the guide flow path G of the guide duct 37. The communicating space 2131 may communicate with a first exhaust flow path F1 of the first exhaust pipe 110.

The blocking member 92 may be elastically supported on the frame coupling body 91. The blocking member 92 may be coupled to the frame coupling body 91 to maintain a state of closing the exhaust portion 213 of the accommodating frame 21. The blocking member 92 may be movable inside the communicating space 2131.

The food waste disposer 1 may include the deodorizing device 100.

The deodorizing device 100 may be connected to the cover device 30. The deodorizing device 100 may include the first exhaust pipe 110 connected to the cover device 30.

The first exhaust pipe 110 may include a first inlet 111 connected to the communicating space 2131 of the frame coupling body 91. The first exhaust pipe 110 may form the first exhaust flow path F1 through which air of the processor 40 flows.

The deodorizing device 100 may be positioned in a rear portion of the food waste disposer 1 to suck air from the processor 40, filter the air, and then discharge the filtered air to the outside. Details about the deodorizing device 100 will be described below.

The food waste disposer 1 may include the water storage container 50.

The water storage container 50 may be positioned in the base housing 11 to collect condensed water generated in the exhaust flow path of the deodorizing device 100.

For example, the water storage container 50 may be installed in a water storage container installing portion 111a of the base housing 11. The water storage container 50 may form a collecting space 5021 therein. The water storage container 50 may be positioned below the filter assembly 150 and connected to the filter assembly 150. Details about the water storage container 50 will be described below.

A flow of air in a state in which the cover device 30 closes the upper portion of the housing 10 will be described with reference to FIG. 5.

As shown in FIG. 5, while the cover device 30 closes the upper portion of the housing 10, the pusher 381 formed in the connecting duct 38 may press the blocking member 92 positioned inside the accommodating frame 21.

For example, the pusher 381 may press the blocking member 92 by passing through the exhaust portion 213 of the accommodating frame 21. According to a rotation of the blocking member 92 pressed toward the communicating space 2131, the blocking member 92 may open the exhaust portion 213 of the accommodating frame 21.

While the blocking member 92 opens the exhaust portion 213 of the accommodating frame 21, inside of the connecting duct 38 may be connected to the communicating space 2131 such that air flows through the inside of the connecting duct 38 and the communicating space 2131.

Also, because the communicating space 2131 communicates with the first inlet 111 of the first exhaust pipe 110, the pusher 381 may open the first inlet 111 of the first exhaust pipe 110 by pressing the blocking member 92.

That is, while the cover device 30 closes the upper portion of the housing 10, the blocking member 92 may elastically move to a position of opening the exhaust portion 213.

Accordingly, inside air of the processor 40 may flow to the cover device 30 through the inlet hole 361 of the cover frame 36 of the cover device 30. Air passed through the inlet hole 361 may flow to the guide duct 37 of the cover device 30. In other words, air of the processor 40 may flow along the guide flow path G.

Thereafter, air passed through the guide duct 37 and the connecting duct 38 may enter the communicating space 2131 through the open exhaust portion 213 of the accommodating frame 21.

The air entered the communicating space 2131 may flow along the first exhaust flow path F1 through the first inlet 111 of the first exhaust pipe 110. The flow of air may be formed by an exhaust fan 140 which will be described below.

Figure 7:
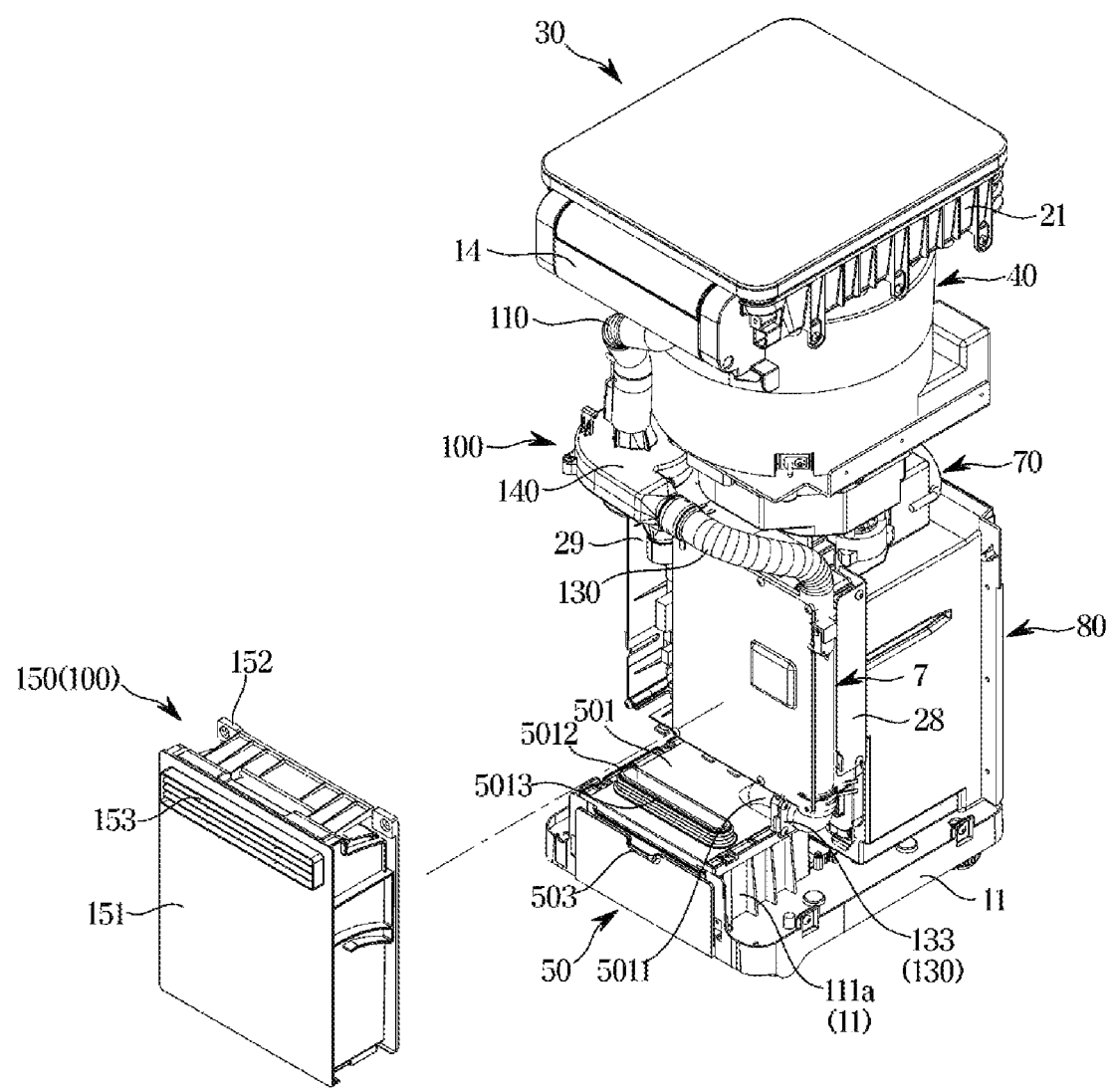
FIG. 7 is an exploded view showing some components of a food waste disposer according to an embodiment of the disclosure in the rear direction.

FIG. 6 is an exploded view showing some components of a food waste disposer according to an embodiment of the disclosure in the front direction. FIG. 7 is an exploded view showing some components of a food waste disposer according to an embodiment of the disclosure in the rear direction.

The food waste disposer 1 may include a plurality of internal frames 20. In FIG. 6, for convenience of description, the cover device 30 and the first cover housing 12 are not shown.

Hereinafter, detailed structures of the internal frames 20 of the food waste disposer 1 and an arrangement of various devices will be described.

Referring to FIGS. 6 and 7, the food waste disposer 1 may include the accommodating frame 21.

The accommodating frame 21 may include a base portion 211, a hinge installing portion 212, an exhaust portion 213, and an opening 214.

The accommodating frame 21 may be positioned between the housing 10 and the processor 40 to cover the outer side of the processor 40. For example, the base portion 211 of the accommodating frame 21 may be positioned between the housing 10 and the processor 40 to cover the outer side of the processor 40.

The hinge installing portion 212 may be formed behind the base portion 211. The hinge housing 14 may be coupled to the hinge installing portion 212 of the accommodating frame 21. The cover device 30 may be coupled to the hinge installing portion 212 of the accommodating frame 21 to be rotatable.

The exhaust portion 213 may be formed behind the base portion 211. The exhaust portion 213 may connect the guide flow path G of the cover device 30 to the exhaust flow path of the deodorizing device 100.

The exhaust portion 213 may communicate with the guide flow path G and the exhaust flow path. The exhaust portion 213 may be formed by cutting a portion of an inner portion of the base portion 211.

The accommodating frame 21 may include the communicating space 2131 connected to the exhaust portion 213. The communicating space 2131 may be formed behind the accommodating frame 21. The exhaust portion opening/closing device 90 may be accommodated in the communicating space 2131.

The opening 214 may open at an inner area of the base portion 211. The processor 40 may be separated from the accommodating frame 21 through the opening 214. The opening 214 may communicate with the inlet of the processor 40.

The food waste disposer 1 may include a support frame 22, a case frame 24, and a fixing frame 25.

The support frame 22 may be positioned below the heating device 60 and support the heating device 60 and the processor 40. The fixing frame 25 may be positioned on a front portion of the support frame 22. The fixing frame 25 may include a frame fixing portion 251 coupled to the case frame 24.

The case frame 24 may accommodate the processor 40. The case frame 24 may have a shape corresponding to the processor 40. For example, the case frame 24 may be in a shape of a cylinder of which an upper side and a lower side open.

The case frame 24 may include a grinding device accommodating space 241. The processor 40 may be positioned in the grinding device accommodating space 241 in such a way as to be spaced a preset distance from the case frame 24.

The case frame 24 may include a case fixing portion 242. The case fixing portion 242 may be coupled to the frame fixing portion 251 of the fixing frame 25. Accordingly, the case frame 24 may be fixed with respect to the fixing frame 25.

The case frame 24 may include a frame coupling portion 243. The case frame 24 may be coupled to the lower portion of the accommodating frame 21 by the frame coupling portion 243. Accordingly, the case frame 24 may be fixed with respect to the accommodating frame 21.

The food waste disposer 1 may include a side frame 23. A pair of side frames 23 may be provided.

The pair of side frames 23 may face each other. The side frames 23 may be coupled to both side surfaces of the accommodating frame 21. The side frames 23 may be coupled to the second cover housing 13.

The side frames 23 may be positioned at left and right sides of the food waste disposer 1 to cover the processor 40, the heating device 60, the driver 70, the storage 80, and the deodorizing device 100.

Referring to FIGS. 4 and 6, the food waste disposer 1 may include a storage frame 26.

The storage frame 26 may form a space in which the storage 80 is accommodated. The storage frame 26 may be connected to the transfer tube 510.

In an unexpected case in which food waste is transferred through the transfer tube 510 in a state in which the storage 80 is not accommodated inside the housing 10, or food waste is discharged from the storage 80 upon withdrawal of the storage 80 by a user, the storage frame 26 may prevent the food waste from influencing other internal components of the food waste disposer 1.

The storage frame 26 may accommodate a storage cover 82 of the storage 80. The storage cover 82 may cover an open upper side of the storage case 81.

Also, the storage cover 82 may be rotatable with respect to the upper side of the storage case 81 to be inclined toward the rear direction upon withdrawal of the storage case 81 in the front direction from the housing 10 and inclined in the front direction upon insertion of the storage case 81 into the housing 10 to seal the upper side of the storage case 81.

The food waste disposer 1 may include a first partition plate 28 positioned behind the storage 80 to partition the electronic component portion 7.

The driver 70 of the food waste disposer 1 may include the first driver 71 and the second driver 72.

The first driver 71 may include the grinder shaft penetrating a center of the heating device 60 and extending upward to provide power to the rotating grinder 42.

The second driver 72 may provide power to the valve assembly 44. Each of the first driver 71 and the second driver 72 may be controlled by the controller.

The heating device 60 may include a first shaft penetrating portion 63 and a first valve penetrating portion 64. The support frame 22 may include a second shaft penetrating portion 221 and a second valve penetrating portion 222.

The first shaft penetrating portion 63 and the second shaft penetrating portion 221 may be aligned in the up-down direction. The first valve penetrating portion 64 and the second valve penetrating portion 222 may be aligned in the up-down direction.

The grinder shaft of the first driver 71 may penetrate the first shaft penetrating portion 63 and the second shaft penetrating portion 221. Accordingly, the first driver 500 may pass through the support frame 22 and the heating device 60 to transfer a driving force to the processor 40.

Because the valve assembly 44 of the processor 40 protrudes downward from the grinding case 41, the valve assembly 44 may protrude below the heating device 60 and the support frame 22 through the first valve penetrating portion 64 and the second valve penetrating portion 222.

The valve assembly 44 protruding below the heating device 60 and the support frame 22 may be driven by the second driver 72.

The valve member 442 of the valve assembly 44 may rotate by the second driver 72 to open or close the discharge hole 4121 of the grinding case 41.

The food waste disposer 1 may include a cooling fan 5.

The cooling fan 5 may be positioned below the heating device 60.

The cooling fan 5 may circulate inside air of the housing 10 to discharge internal heat of the housing 10 to the outside. The cooling fan 5 may be positioned to one side of the driver 70. The cooling fan 5 may be positioned in front of the exhaust fan 140.

The deodorizing device 100 may be positioned at a rear area of the processor 40. The deodorizing device 100 may be positioned on an inner side of the second cover housing 13.

Referring to FIGS. 6 and 7, the deodorizing device 100 may include the first exhaust pipe 110, the exhaust fan 140, a second exhaust pipe 130, and the filter assembly 150.

The exhaust fan 140 may be positioned inside the housing 10 to form a flow of air. The exhaust fan 140 may be positioned in a rear area of the housing 10. The exhaust fan 140 may suck air from the processor 40. The first exhaust pipe 110 and the second exhaust pipe 110 may be connected to the exhaust fan 140.

The first exhaust pipe 110 may be connected to the exhaust fan 140 at an upstream side of the exhaust fan 140, and the second exhaust pipe 130 may be connected to the exhaust fan 140 at a downstream side of the exhaust fan 140. The first exhaust pipe 110 may be connected to the exhaust fan 140 to form the first exhaust flow path F1 (see FIG. 8) communicating with the guide flow path G.

Figure 8:
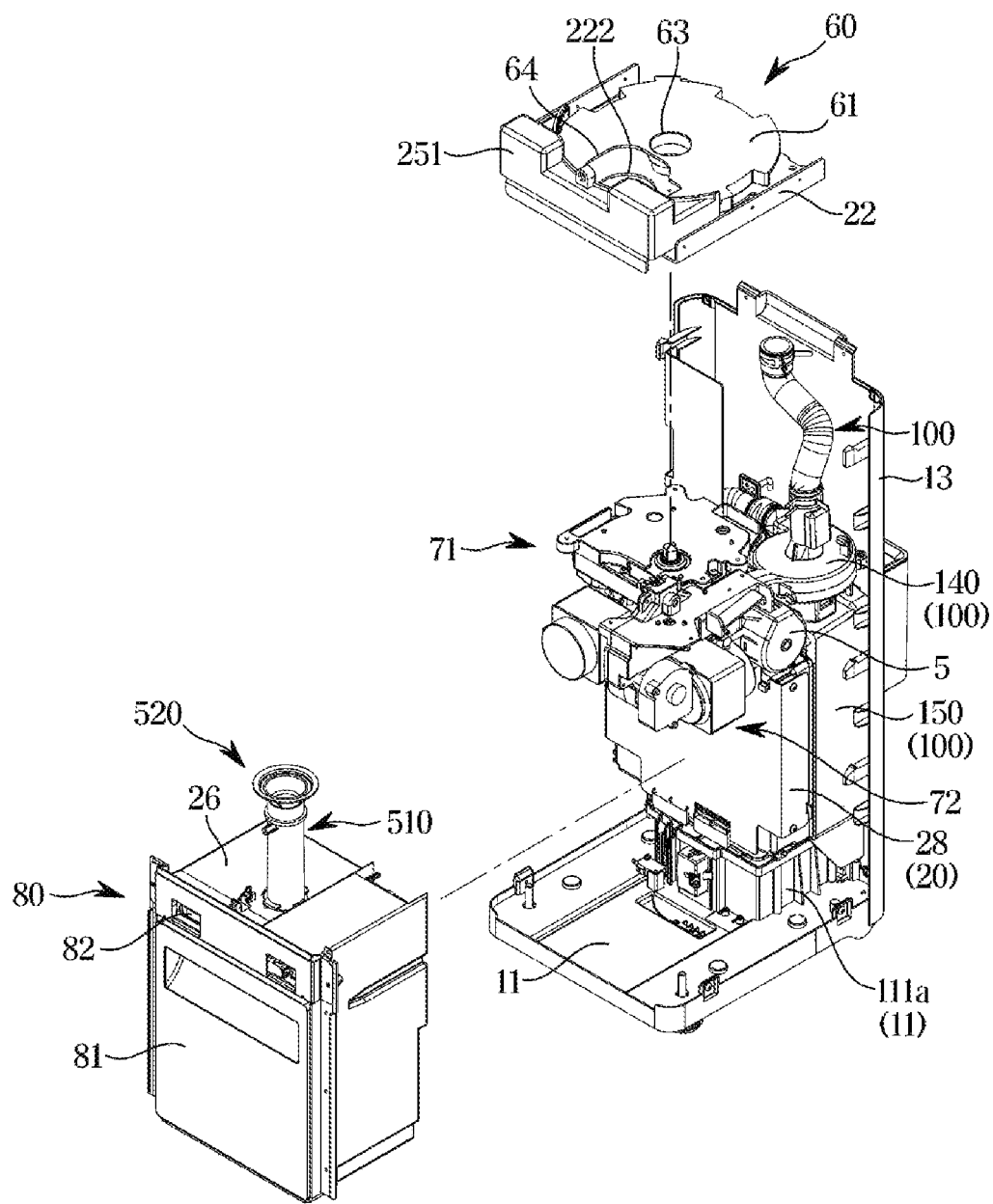
FIG. 8 is an exploded view showing components, such as a storage, a transfer tube, a connector, etc., of the food waste disposer shown in FIG. 6.

The first exhaust pipe 110 may form the first exhaust flow path F1 (see FIG. 8). The second exhaust pipe 130 may form a second exhaust flow path F2 (see FIG. 8). The first exhaust flow path F1 and the second exhaust flow path F2 may be collectively referred to as exhaust flow paths.

Air entered the first exhaust pipe 110 and the second exhaust pipe 130 from the processor 40 by the exhaust fan 140 may flow along the first exhaust pipe 110 and the second exhaust pipe 130.

The filter assembly 150 may adsorb pollutants from air flowing along the first exhaust pipe 110 and the second exhaust pipe 130. A filter for filtering pollutants in air may be provided inside the filter assembly 150.

The filter assembly 150 may be connected to the exhaust flow paths through the exhaust pipes to adsorb pollutants from air flowing along the first exhaust flow path F1 and the second exhaust flow path F2.

Air entered the first exhaust pipe 110 and the second exhaust pipe 130 from the processor 40 may flow along the exhaust flow paths. The filter assembly 150 may be connected to the exhaust flow paths. More specifically, the filter assembly 150 may be connected to the exhaust flow paths through the first exhaust pipe 110 and the second exhaust pipe 130.

The water storage container 50 may be connected to the filter assembly 150 and the second exhaust pipe 130. Accordingly, air flowing along the second exhaust pipe 130 may pass through the inside of the water storage container 50 and then flow to the filter assembly 150.

The water storage container 50 may be installed in the water storage container installing portion 111a of the base housing 11. The water storage container 50 may include a water storage cover 501.

The water storage cover 501 may form an upper surface of the water storage container 50. The water storage cover 501 may include a connecting pipe coupling portion 5011 connected to the second exhaust pipe 130. For example, the connecting pipe coupling portion 5011 of the water storage cover 501 may be coupled to a coupling flange 133 of the second exhaust pipe 130.

The water storage cover 501 may include a filter coupling portion 5012. The filter coupling portion 5012 may extend upward from the water storage cover 501 to be connected to a lower portion of the filter assembly 150. The filter coupling portion 5012 may form a path along which air entered the water storage container 50 through the second exhaust pipe 130 flows to the filter assembly 150.

The water storage container 50 may include a filter sealing member 5013 coupled to the filter coupling portion 5012. The filter sealing member 5013 may seal a gap between the water storage container 50 and the filter assembly 150.

The water storage container 50 may include a gripping portion 503. The gripping portion 503 may be exposed to an outer side of the second cover housing 13 of the food waste disposer 1. A user may separate the water storage container 50 from the housing 10 by gripping the gripping portion 503 to remove collected, condensed water.

The filter assembly 150 may include a filter case 151 in which a filter is accommodated. The filter case 151 may be coupled to a filter installing plate 152. The filter installing plate 152 may be coupled to the second partition plate 29 that partitions the electronic component portion 7 from behind.

A filter discharge portion 153 may be formed in a rear portion of the filter case 151. Air flowing along the first exhaust pipe 110 and the second exhaust pipe 130 may pass through the inside of the water storage container 50 to flow to the filter assembly 150, and then, pollutants of the air may be removed by the filter assembly 150 and discharged to the outside of the food waste disposer 1 through the filter discharge portion 153.

Figure 9:
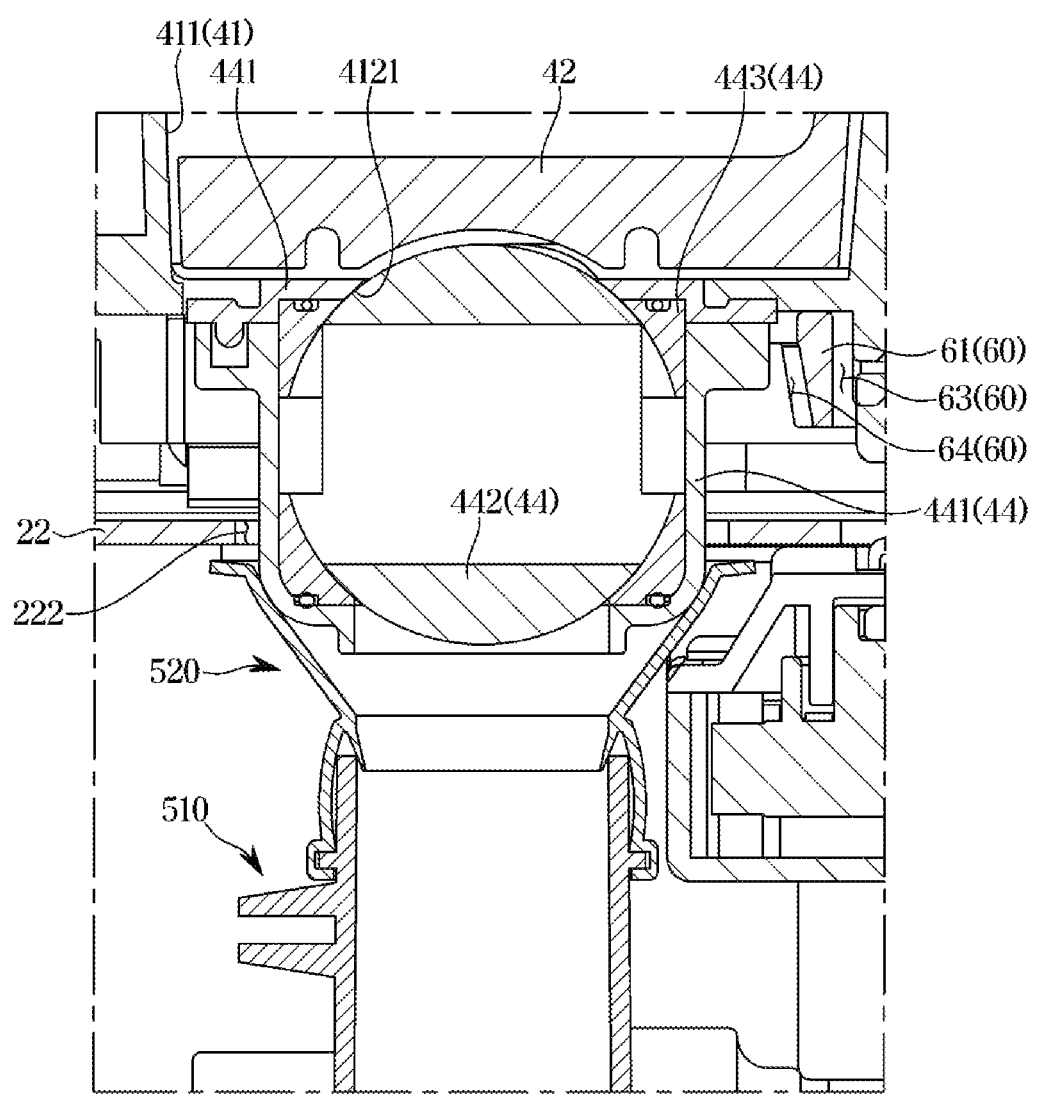
FIG. 9 is an enlarged view showing a B part of FIG. 4.

FIG. 8 is an exploded view showing components, such as a storage, a transfer tube, a connector, etc., of the food waste disposer shown in FIG. 6. FIG. 9 is an enlarged view showing a B part of FIG. 4.

Referring to FIGS. 8 and 9, the food waste disposer 1 may include the storage 80 that is accommodated inside the storage frame 26.

The upper side of the storage case 81 of the storage 80 may be sealed by the storage cover 82.

The food waste disposer 1 may include the transfer tube 510 penetrating the storage frame 26 and the storage cover 82.

The connector 520 may be installed in or coupled to the transfer tube 510. The connector 520 may be coupled to an upper end portion of the transfer tube 510.

The transfer tube 510 may be positioned in front of the first driver 71. The valve assembly 44 may protrude below the support frame 22 by penetrating the first valve penetrating portion 64 formed in the heating frame 61 of the heating device 60 and the second valve penetrating portion 222 of the support frame 22.

The connector 520 may support a lower portion of the valve assembly 44. The connector 520 may be positioned below the support frame 22 to support the lower portion of the valve assembly 44.

The connector 520 may cover a lower end portion of the valve assembly 44 to prevent food waste treated in the processor 40 from discharging out of the connector 520 while the valve member 442 of the valve assembly 44 opens the discharge hole 4121 of the grinding case 41.

Because a shape of the connector 520 has a greater radius at an upper portion, a large amount of food waste may be transferred from the valve assembly 44 to the transfer tube 510. For example, the connector 520 may be in a shape of a funnel.

The connector 520 may be coupled to the upper end portion of the transfer tube 510 and pressed downward by a weight of the processor 40. The connector 520 may be made of a material of which a shape is deformable.

Because the connector 520 is pressed by the weight of the processor 40, a lower surface of the processor 40 may be in contact with the heating device 60.

Hereinafter, the connector 520 and the transfer tube 510 will be described in detail.

Figure 10:
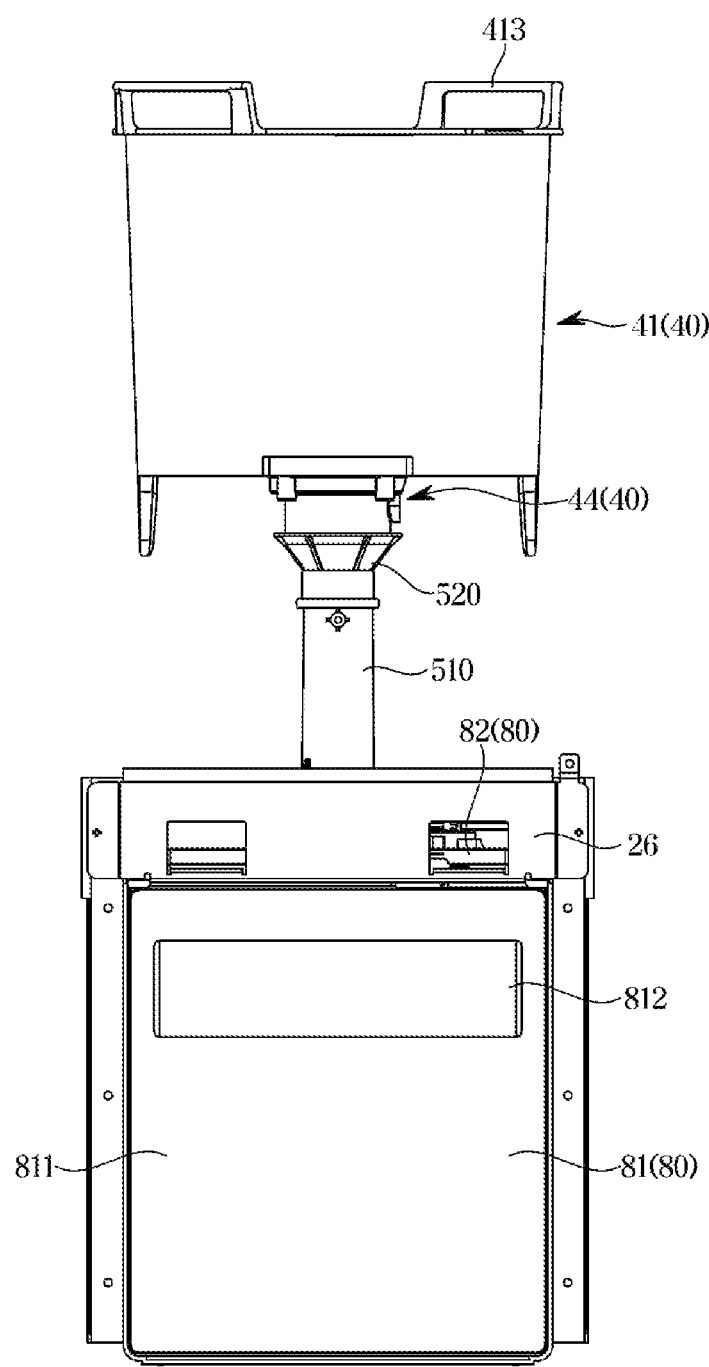
FIG. 10 shows a coupled state of a processor, a connector, a transfer tube, a storage frame, and a storage, according to an embodiment of the disclosure, in the front direction.
Figure 11:
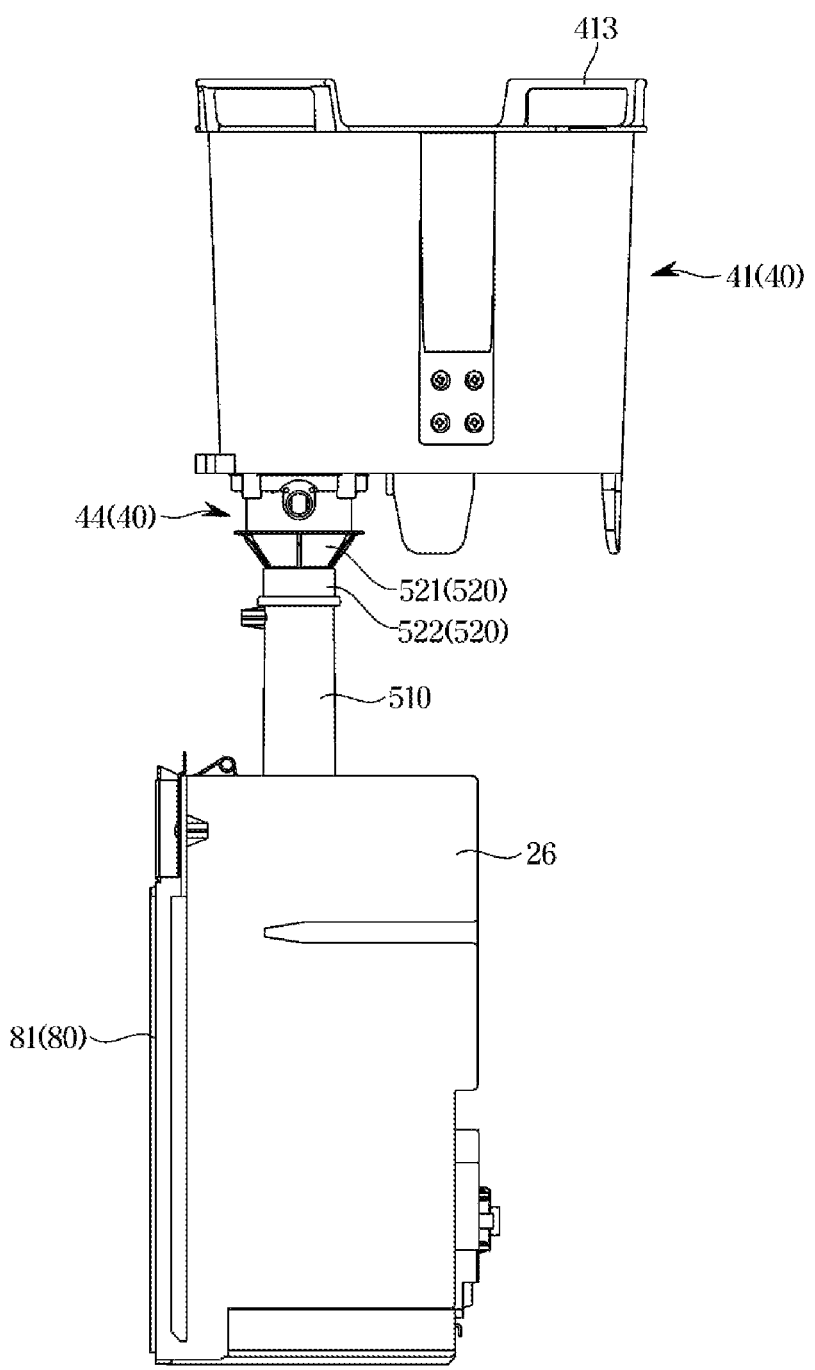
FIG. 11 shows a side portion of a food waste disposer shown in FIG. 10.
Figure 12:
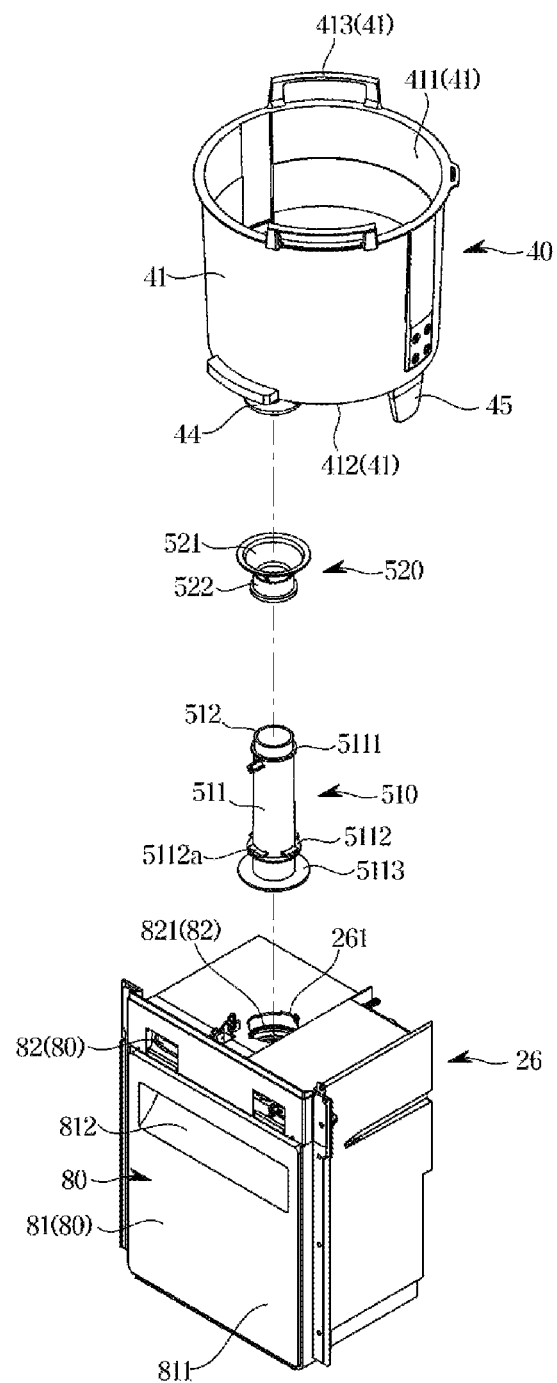
FIG. 12 is an exploded view showing components of the food waste disposer shown in FIG. 10.

FIG. 10 shows a coupled state of a processor, a connector, a transfer tube, a storage frame, and a storage, according to an embodiment of the disclosure, in the front direction. FIG. 11 shows a side portion of a food waste disposer shown in FIG. 10. FIG. 12 is an exploded view showing components of the food waste disposer shown in FIG. 10.

Referring to FIGS. 10 to 12, the food waste disposer 1 may include the grinding case 41, and the valve assembly 44 installed in the grinding case 41 to open or close the discharge hole 4121 of the grinding case 41.

The grinding case 41 may treat food waste. Food waste may be grinded, stirred, and heated inside the grinding case 41. The grinding case 41 may include a side wall 411, and the discharge hole 4121 may be formed in the bottom 412 of the grinding case 41. The grinding case 41 may be separable from the inside of the housing 10 to the outside.

The valve assembly 44 may be installed in the grinding case 41 below the discharge hole 4121. For example, the valve assembly 44 may be installed on a lower surface of the grinding case 41 in such a way as to protrude below the grinding case 41.

Upon separation of the grinding case 41 from the inside of the housing 10 to the outside, the valve assembly 44 may also be separated from the inside of the housing 10 to the outside together with the grinding case 41.

The grinding case 41 may include a case extension portion 45. The case extension portion 45 may extend downward from the side wall 411 of the grinding case 41 to press an installation detecting sensor (not shown) inside the housing 10.

Accordingly, the food waste disposer 1 may detect installation of the processor 40 in the housing 10.

The connector 520 may include an upper body 521 and a lower body 522.

The valve assembly 44 of the processor 40 may be rested on the upper body 521. The upper body 521 may be inclined such that the valve assembly 44 is in contact with the upper body 521.

For example, the upper body 521 may be in a shape of a funnel having a greater radius at the upper portion.

The lower body 522 may extend downward from the upper body 521 to surround a portion of the transfer tube 510.

The lower body 522 may be in contact with an outer surface of the transfer tube 510. Also, upon installation of the processor 40, a shape of the lower body 522 may be deformed to be spaced from the outer surface of the transfer tube 510.

The transfer tube 510 may include a transfer body 511 and a transfer end portion 512.

The transfer body 511 may form a space through which food waste treated in the processor 40 is transferred. For example, the transfer body 511 may be in a shape of a tube having a circular space. The transfer body 511 may extend in the up-down direction.

One side of the transfer body 511 may be connected to the connector 520, and another side of the transfer body 511 may be connected to the storage 80 by penetrating the storage frame 26.

The transfer tube 510 may include a connector installing portion 5111 extending outward in a radial direction from the transfer body 511 such that the connector 520 is inserted in the connector installing portion 5111. The connector installing portion 5111 may be formed at an upper portion of the transfer body 511. The connector installing portion 5111 may be provided in a shape of a ring along an outer surface of the transfer body 511.

The transfer tube 510 may include a storage frame support portion 5112 and a cover sealing portion 5113.

The storage frame support portion 5112 and the cover sealing portion 5113 may be formed at a lower portion of the transfer body 511.

For example, the storage frame support portion 5112 and the cover sealing portion 5113 may be inserted in the storage frame 26.

Accordingly, the storage frame support portion 5112 and the cover sealing portion 5113 may be positioned at a lower location than the connector installing portion 5111.

The storage frame support portion 5112 and the cover sealing portion 5113 may extend outward in the radial direction from the transfer body 511.

The storage frame support portion 5112 may be in contact with an inner surface of the storage frame 26. The storage frame support portion 5112 may include a fixing flange 5112a. The fixing flange 5112a may extend upward from the storage frame support portion 5112.

In FIG. 12, a plurality of fixing flanges 5112a are shown. However, a single fixing flange 5112a may be formed, and a number of the fixing flanges 5112a is not limited.

The cover sealing portion 5113 may be accommodated inside the storage cover 82 to seal a gap with the storage cover 82. A sealing gasket 513 (see FIG. 4) may be positioned between the cover sealing portion 5113 and the storage cover 82 to prevent bad small of food waste stored in the storage case 81 from discharging to the outside through a tube passage portion 821 of the storage cover 82 which will be described below. The sealing gasket 513 may be inserted in the cover sealing portion 5113.

However, a position of the sealing gasket 513 is not limited to this, and the sealing gasket 513 may be inserted in the storage cover 82.

The storage 80 may include the storage case 81 and the storage cover 82.

The storage case 81 may be positioned below the grinding case 41. The storage case 81 may store food waste grinded in the grinding case 41.

The storage case 81 may be positioned inside the storage frame 26. The storage case 81 may be separable from inside of the storage frame 26 to outside of the storage frame 26.

The storage cover 82 may be positioned inside the storage frame 26 to cover the open upper side of the storage case 81. The storage cover 82 may be rotatable inside the storage frame 26.

For example, the storage cover 82 may rotate, upon withdrawal of the storage case 81 to the outside of the storage frame 26, such that a front portion of the storage cover 82 is inclined upward by the storage frame 26. Thereafter, upon insertion of the storage case 81 into the inside of the storage frame 26, the storage cover 82 may rotate such that the front portion of the storage cover 82 is inclined downward by the storage frame 26.

That is, the storage cover 82 may seal the upper side of the storage case 81 upon insertion of the storage case 81 and open the upper side of the storage case 81 upon withdrawal of the storage case 81. In other words, the storage cover 82 may selectively cover the open upper side of the storage case 81.

The storage frame 26 may support the storage cover 82 to assist a rotation of the storage cover 82.

The storage case 81 may include the storage body 811 and the storage gripping portion 812.

The storage body 811 may form an appearance of the storage case 81 and accommodate food waste therein. The storage body 811 may be in a shape of a box of which an upper side opens.

The storage gripping portion 812 may be depressed inward from a front surface of the storage body 811 to enable a user to grip the storage gripping portion 812. However, a shape of the storage gripping portion 812 is not limited to this. A handle, etc. may be coupled to the front surface of the storage body 811 to enable a user to grip the handle, etc.

The storage frame 26 may include a tube support portion 261. The tube support portion 261 may be formed by cutting a portion of an upper side of the storage frame 26. The transfer tube 510 may be inserted in the storage frame 26 through the tube support portion 261 of the storage frame 26.

The tube support portion 261 of the storage frame 26 may be in contact with the storage frame support portion 5112 of the transfer tube 510. Because the storage frame support portion 5112 of the transfer tube 510 is in contact with the tube support portion 261 of the storage frame 26, a position of the transfer tube 510 may be firmly fixed to the storage frame 26.

In the storage cover 82, the tube passage portion 821 may be formed. The tube passage portion 821 may be formed by cutting a portion of the upper side of the storage cover 82. An end portion of the transfer tube 510 may penetrate the storage cover 82 through the tube passage portion 821 of the storage cover 82 and be positioned inside the storage case 81.

The tube passage portion 821 of the storage cover 82 may be connected to the cover sealing portion 5113 of the transfer tube 510. More specifically, the sealing gasket 513 may be positioned between the tube passage portion 821 of the storage cover 82 and the cover sealing portion 5113 of the transfer tube 510.

Accordingly, a lower end portion of the transfer tube 510 may be positioned inside the storage case 81 of the storage 80 to prevent food waste from discharging out of the storage 80.

Also, the upper end portion of the transfer tube 510 may be connected to the connector 520 to prevent food waste from discharging out of the valve assembly 44.

Figure 13:
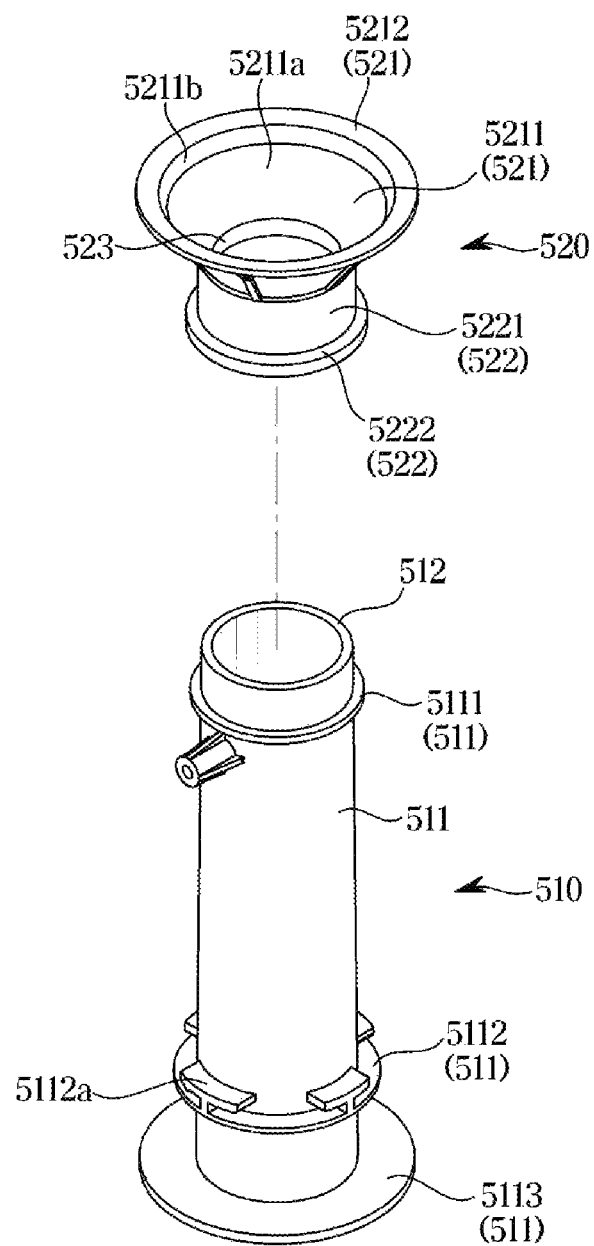
FIG. 13 shows the connector and the transfer tube shown in FIG. 12.
Figure 14:
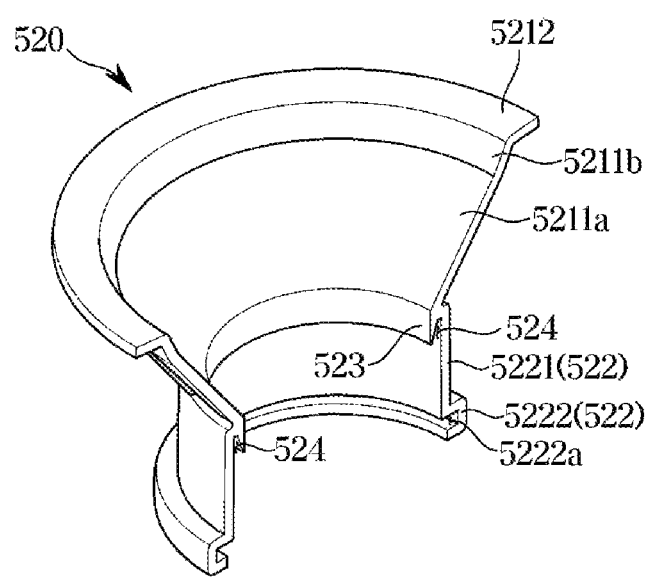
FIG. 14 is a cross-sectional perspective view of the connector shown in FIG. 12.

FIG. 13 shows the connector and the transfer tube shown in FIG. 12. FIG. 14 is a cross-sectional perspective view of the connector shown in FIG. 12.

Referring to FIGS. 13 and 14, the connector 520 may include a valve resting portion 5211 and a valve cover portion 5212 that are formed in the upper body 521.

The valve resting portion 5211 may be in contact with the valve assembly 44. The lower portion of the valve assembly 44 may be rested on the valve resting portion 5211.

The valve resting portion 5211 may include a first inclined surface 5211a and a second inclined surface 5211b.

The first inclined surface 5211a may extend with a first angle with respect to an installation surface of the food waste disposer 1. The second inclined surface 5211b may extend with a second angle which is different from the first angle, with respect to the installation surface of the food waste disposer 1.

For example, the second inclined surface 5211b may be inclined with an angle that is greater than the first inclined surface 5211a. That is, the second angle may be greater than the first angle.

The valve cover portion 5212 may extend outward from the valve resting portion 5211. The valve cover portion 5212 may extend substantially horizontally from the valve resting portion 5211. The valve cover portion 5212 may be in a shape of a ring.

The connector 520 may include a transfer tube cover portion 5221 and a fixing portion 5222 formed in the lower body 522.

The transfer tube cover portion 5221 may be in contact with the outer surface of the transfer body 511 of the transfer tube 510 in a case in which the valve assembly 44 does not press the upper body 521 of the connector 520. In other words, the transfer tube cover portion 5221 may be in contact with the outer surface of the transfer body 511 in a case in which the processor 40 is not installed inside the housing 10.

Also, the transfer tube cover portion 5221 may be bendable outward in a radial direction of the transfer tube 510 according to pressing of the upper body 521 of the connector 520 by the valve assembly 44.

The fixing portion 5222 may be connected to the transfer tub cover portion 5221, wherein a portion of the transfer tube 510 may be inserted in the fixing portion 5222.

The fixing portion 5222 may be fixed in position with respect to the transfer tube 510. The fixing portion 5222 may be fixed in position with respect to the transfer tube 510 such that the connector installing portion 5111 of the transfer tube 510 is inserted in the fixing portion 5222.

A transfer tube accommodating space 5222a may be formed inside the fixing portion 5222. The connector installing portion 5111 of the transfer tube 510 may be accommodated in the transfer tube accommodating space 5222a of the fixing portion 5222 to primarily secure airtightness between the connector 520 and the transfer tube 510.

The connector 520 may include a sealing flange 523 and a transfer tube inserting groove 524.

The sealing flange 523 may extend toward the transfer tube 510 from an inner surface of the connector 520. The sealing flange 523 may be in contact with the transfer end portion 512 of the transfer tube 510.

The sealing flange 523 may extend toward an inner surface of the transfer tube 510 from a portion at which the upper body 521 is connected to the lower body 522.

The transfer tube inserting groove 524 may be formed between the sealing flange 523 and the inner surface of the connector 520. More specifically, the transfer tube inserting groove 524 may be formed between the sealing flange 523 and the lower body 522.

The transfer end portion 512 of the transfer tube 510 may be inserted in the transfer tube inserting groove 524. The transfer tube inserting groove 524 may open downward.

Through this configuration of the sealing flange 523, airtightness between the connector 520 and the transfer tube 510 may be secondarily secured upon deformation in shape of the connector 520.

The connector 520 may include a silicon material. However, a material of the connector 520 is not limited to a silicon material, and the connector 520 may be made of any material that has thermal resistance and is elastically deformable.

Figure 15:
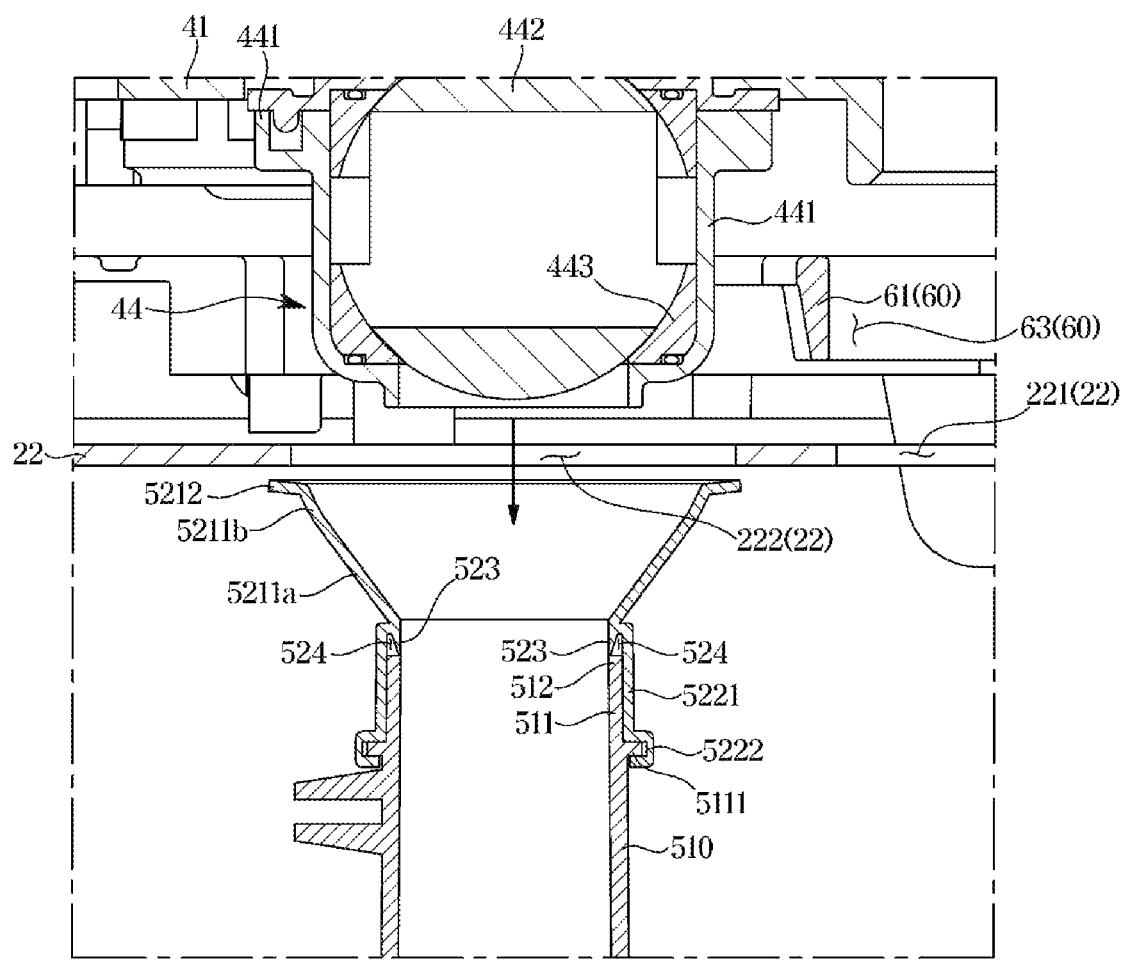
FIGS. 15 and 16 show an operation in which a connector is deformed in a process of installing a processor of a food waste disposer according to an embodiment of the disclosure in a housing.
Figure 16:
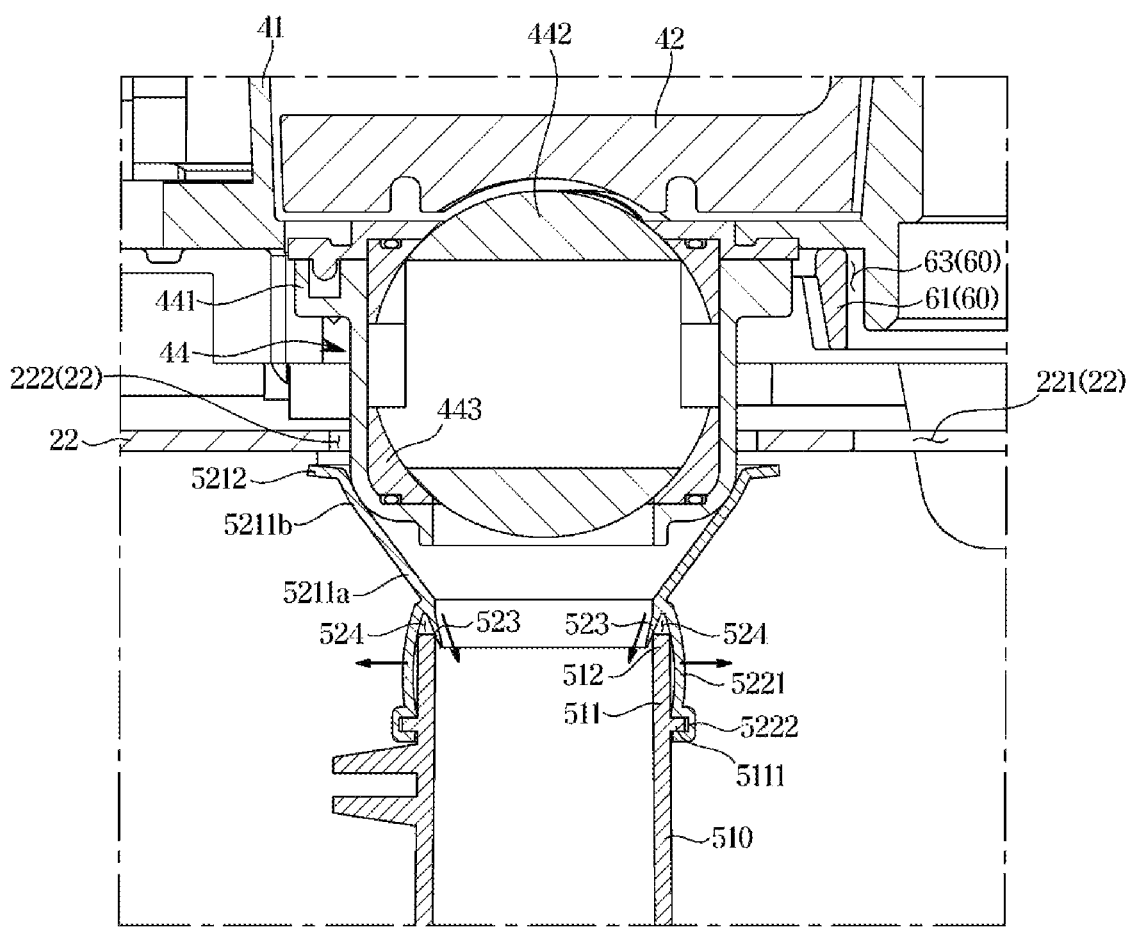

FIGS. 15 and 16 show an operation in which a connector is deformed in a process of installing a processor of a food waste disposer according to an embodiment of the disclosure in a housing.

Deformation in shape of the connector 520 according to installation of the processor 40 will be described with reference to FIGS. 15 and 16.

Referring to FIG. 15, in a case in which the processor 40 is not completely installed inside the housing 10, the connector 520 may be in contact with the outer surface of the transfer tube 510.

For example, an inner surface of the lower body 522 of the connector 520 may be in contact with the outer surface of the transfer tube 510 in a state of facing the outer surface of the transfer tube 510.

The fixing portion 5222 of the connector 520 may be coupled to the transfer tube 510 to surround the connector installing portion 5111 of the transfer tube 510.

The sealing flange 523 of the connector 520 may be in a state of not moving to inside of the transfer tube 510. The transfer end portion 512 of the transfer tube 510 may be not inserted in the transfer tube inserting groove 524 of the connector 520.

Referring to FIG. 16, in a case in which the processor 40 is completely installed inside the housing 10, the shape of the connector 520 may be deformed. The valve assembly 44 of the processor 40 may be rested on the valve resting portion 5211 formed in the upper body 521 of the connector 520. The shape of the connector 520 may be deformable upon resting of the valve assembly 44 thereon.

For example, the lower portion of the valve assembly 44 may be rested on the portion at which the first inclined surface 5211a of the valve resting portion 5211 of the connector 520 is connected to the second inclined surface 5211b. An angle of inclination of the second inclined surface 5211b may be greater than an angle of inclination of the first inclined surface 5211a, and accordingly, an outer surface of the valve assembly 44 may be more effectively covered.

Also, the valve cover portion 5212 of the connector 520 may extend outward from the valve resting portion 5211, and accordingly, food waste that is discharged to the outside of the grinding case 41 through the valve assembly 44 may be prevented from entering the housing 10.

Upon installation of the processor 40 in the housing 10, the transfer end portion 512 of the transfer tube 510 may be inserted in the transfer tube inserting groove 524. For example, the connector 520 may be deformed to move downward such that the transfer end portion 512 of the transfer tube 519 is inserted in the transfer tube inserting groove 524.

A height of the connector 520 may change along the up-down direction. The up-down direction may be defined as a direction in which the processor 40 presses the connector 520.

Because the fixing portion 5222 of the connector 520 is supported by the connector installing portion 5111 of the transfer tube 510, a shape of the fixing portion 5222 of the connector 520 may be not deformed.

However, because the valve assembly 44 presses the connector 520 downward, the transfer tube cover portion 5221 of the connector 520 may be bent outward in the radial direction of the transfer tube 510 in a state of being in contact with the transfer tube 510.

At this time, according to pressing of the upper body 521 of the connector 520 by the valve assembly 44, the sealing flange 523 of the connector 520 may move to inside of the transfer tube 510.

In other words, the connector 520 may be coupled to the upper portion of the transfer tube 510 to guide food waste processed in the processor 40 to the transfer tube 510, and upon installation of the processor 40 in the housing 10, the connector 520 may be pressed downward by the processor 40 and deformed in shape such that a portion of the connector 520 may be inserted in the transfer end portion 512 of the transfer tube 510.

Accordingly, the disclosure may provide the connector 520 of which the shape is deformable to prevent generation of a gap between the processor 40 and the heating device 60, thereby effectively transferring heat from the heating device 60 to the processor 40.

Also, although a gap may be formed between the transfer tube 510 and the connector 520 in the case in which the shape of the connector 520 is deformable, airtightness of the portion at which the connector 520 is connected to the transfer tube 510 may be secured even upon deformation in shape of the connector 520 by providing the sealing flange 523 for effectively covering the gap.

Also, by forming the connector 520 having a shape capable of maximally covering the outer surface of the valve assembly 44, a situation in which food waste enters the housing 10 according to installation and detachment of the processor 40 may be effectively prevented.

So far, specific embodiments have been shown and described, however, the disclosure is not limited to these embodiments. It should be interpreted that various modifications may be made by one of ordinary skill in the technical art to which the disclosure belongs, without deviating from the gist of the technical concept of the disclosure, which is defined in the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A food waste disposer comprising:
    a housing;
    a grinding case positioned inside the housing, configured to grind food waste, and separable from the housing, wherein a discharge hole is formed in a bottom of the grinding case;
    a valve assembly coupled to the grinding case below the discharge hole and configured to open or close the discharge hole, the valve assembly protruding below the grinding case;
    a storage case positioned below the grinding case and configured to store the grinded food waste from the grinding case;
    a transfer tube positioned between the valve assembly and the storage case and configured to transfer the grinded food waste from the grinding case to the storage case; and
    a connector coupled to the transfer tube, wherein a shape of the connector is deformable upon the valve assembly resting on the connector.

2. The food waste disposer of claim 1, wherein the connector comprises a sealing flange extending from an inner surface of the connector toward the transfer tube.

3. The food waste disposer of claim 2, wherein the transfer tube comprises:
    a transfer body forming a space through which the grinded food waste is transferred; and
    a transfer end portion formed at an upper portion of the transfer body and in contact with the sealing flange of the connector.

4. The food waste disposer of claim 3, wherein the connector comprises a transfer tube inserting groove formed between the inner surface of the connector and the sealing flange.

5. The food waste disposer of claim 4, wherein upon installation of the grinding case in the housing, the shape of the connector is deformed so that the transfer end portion of the transfer tube is inserted into the transfer tube inserting groove.

6. The food waste disposer of claim 1, wherein the connector comprises:
    an upper body extending at an incline so that the valve assembly rests on the upper body;
    a lower body extending downward from the upper body and surrounding a portion of the transfer tube; and
    a sealing flange extending toward an inner surface of the transfer tube from a portion at which the upper body is connected to the lower body.

7. The food waste disposer of claim 6, wherein the sealing flange moves to an inside of the transfer tube according to the valve assembly compressing the upper body.

8. The food waste disposer of claim 7, wherein the lower body comprises a transfer tube cover portion configured to bend outward in a radial direction of the transfer tube according to the valve assembly compressing the upper body.

9. The food waste disposer of claim 8, wherein the lower body further comprises a fixing portion connected to the transfer tube cover portion and fixed in position with respect to the transfer tube by inserting a portion of the transfer tube in the fixing portion.

10. The food waste disposer of claim 6, wherein the upper body comprises:
    a valve resting portion in contact with the valve assembly; and
    a valve cover portion extending outward from the valve resting portion.

11. The food waste disposer of claim 10, wherein the valve resting portion comprises:
    a first inclined surface extending with a first angle with respect to an installation surface; and
    a second inclined surface extending with a second angle with respect to the installation surface, wherein the second angle is different from the first angle.

12. The food waste disposer of claim 1, further comprising a storage including a storage cover configured to selectively cover an open upper side of the storage case.

13. The food waste disposer of claim 12, wherein the transfer tube comprises:
    a transfer body forming a space through which food waste is transferred;
    a connector installing portion extending outward in a radial direction from the transfer body so that the connector is inserted in the connector installing portion; and
    a cover sealing portion accommodated inside the storage cover and extending outward in the radial direction from the transfer body at a lower location than the connector installing portion to seal a gap with the storage cover.

14. The food waste disposer of claim 1, wherein the connector includes a silicon material.

15. The food waste disposer of claim 1, wherein a height of the connector changes along an up-down direction.

16. A food waste disposer comprising:
    a housing;
    a processor configured to treat food waste and separable from inside of the housing;

a storage positioned below the processor inside the housing and configured to store the treated food waste from the processor;

a transfer tube of which one side is coupled to the storage, wherein the transfer tube is fixed between the processor and the storage; and a connector coupled to an upper portion of the transfer tube and configured to guide the treated food waste in the processor to the transfer tube, wherein upon installation of the processor in the housing, the connector is pressed downward by the processor and a shape of the connector is deformed such that a portion of the connector is inserted in a transfer end portion of the transfer tube.

17. The food waste disposer of claim 16, further comprising:
  a sealing flange extending from an inner surface of the connector toward the transfer tube and accommodatable inside the transfer tube.

18. The food waste disposed of claim 16, wherein the connector may include an upper body formed at an incline such that a portion of the processor rests on the upper body, and a lower body extending downward from the upper body to cover an outer surface of the transfer tube, the lower body bendable outward in a radial direction of the transfer tube.

19. A food waste disposer comprising:
  a housing;
  a processor configured to treat food waste and separable from an inside of the housing;
  a storage positioned below the processor inside of the housing and configured to store the grinded food waste from the processor;
  a transfer tube of which a lower portion is coupled to the storage, the transfer tube positioned between the processor and the storage; and
  a connector coupled to an upper portion of the transfer tube and connecting the processor to the transfer tube, wherein a shape of the connector is deformable, wherein the connector includes:
  an upper body on which the processor rests;
  a lower body extending downward from the upper body to cover an outer surface of the transfer tube and bendable outward in a radial direction of the transfer tube; and
  a sealing flange extending from an inner surface of the lower body toward inside of the transfer tube.

20. The food waste disposer of claim 16, further comprising:
  a transfer tube inserting groove formed between the sealing flange and the lower body.

* * * * *